United States Patent
Ando et al.

(10) Patent No.: US 9,977,293 B2
(45) Date of Patent: May 22, 2018

(54) ELECTRONIC EYEGLASS AND LIQUID CRYSTAL LENS PRODUCTION METHODS

(75) Inventors: Tomohiro Ando, Higashimurayama (JP); Kenji Matsumoto, Setagaya-ku (JP); Ayano Tanabe, Nerima-ku (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 819 days.

(21) Appl. No.: 13/575,804

(22) PCT Filed: Jan. 31, 2011

(86) PCT No.: PCT/JP2011/052451
§ 371 (c)(1),
(2), (4) Date: Jul. 27, 2012

(87) PCT Pub. No.: WO2011/093530
PCT Pub. Date: Aug. 4, 2011

(65) Prior Publication Data
US 2013/0037202 A1 Feb. 14, 2013

(30) Foreign Application Priority Data

Jan. 29, 2010 (JP) .................................. 2010-019079
Jun. 8, 2010 (JP) .................................. 2010-131401

(51) Int. Cl.
*G02F 1/1341* (2006.01)
*G02C 7/08* (2006.01)
(Continued)

(52) U.S. Cl.
CPC ........... *G02F 1/1341* (2013.01); *G02C 7/083* (2013.01); *G02F 1/133371* (2013.01);
(Continued)

(58) Field of Classification Search
CPC .... G02F 1/13; G02F 1/133371; G02F 1/1341; G02F 2001/13415; G02C 2202/20; G02C 7/083
See application file for complete search history.

(56) References Cited

U.S. PATENT DOCUMENTS 5,124,836 A 6/1992 Kikuchi
6,626,532 B1 9/2003 Nishioka et al.
(Continued)

FOREIGN PATENT DOCUMENTS

EP 2233964 A1 9/2010
JP S49-13439 B 3/1974
(Continued)

OTHER PUBLICATIONS

EP Search Report for European Patent Application No. 11737234.2, dated Aug. 7, 2013.
(Continued)

*Primary Examiner* — Christopher T Schatz

(57) ABSTRACT

An object of the present invention is to provide electronic eyeglass and liquid crystal lens production methods that eliminate the need for forming a liquid crystal injection path in the liquid crystal lens, while making provisions so as to be able to sufficiently maintain a prescribed gap between substrates. The electronic eyeglass and liquid crystal lens production methods includes the steps of placing a sealing agent so as to form a closed planar region on at least one of first and second transparent substrates, dropping a liquid crystal material into an inside space enclosed by the sealing agent, bonding the other of the transparent substrates onto the one transparent substrate on which the liquid crystal material has been dripped, and filling a resin into a space created outside the sealing agent.

13 Claims, 29 Drawing Sheets

(51) Int. Cl.
*G02F 1/1333* (2006.01)
*G02F 1/29* (2006.01)
*G02F 1/1345* (2006.01)
*H04N 13/04* (2006.01)

(52) U.S. Cl.
CPC ........ *G02C 2202/20* (2013.01); *G02F 1/1345* (2013.01); *G02F 2001/13415* (2013.01); *G02F 2001/294* (2013.01); *H04N 13/0438* (2013.01)

(56) References Cited

U.S. PATENT DOCUMENTS

| | | | |
|---|---|---|---|
| 2001/0004281 A1* | 6/2001 | Sasaki | G02F 1/1339 349/190 |
| 2004/0179148 A1 | 9/2004 | Nishioka et al. | |
| 2005/0011609 A1* | 1/2005 | Lee | G02F 1/1341 156/285 |
| 2007/0216862 A1* | 9/2007 | Blum et al. | 351/168 |
| 2009/0256977 A1 | 10/2009 | Haddock | |
| 2009/0301637 A1* | 12/2009 | Reichert | E06B 3/66314 156/109 |
| 2010/0265456 A1 | 10/2010 | Matsui et al. | |
| 2012/0075575 A1 | 3/2012 | Matsui et al. | |
| 2012/0075576 A1 | 3/2012 | Matsui et al. | |
| 2012/0075578 A1 | 3/2012 | Matsui et al. | |
| 2012/0081659 A1 | 4/2012 | Matsui et al. | |

FOREIGN PATENT DOCUMENTS

| | | |
|---|---|---|
| JP | S52-28296 A | 3/1977 |
| JP | S63-206721 A | 8/1988 |
| JP | H01-186911 A | 7/1989 |
| JP | H03-35523 U | 4/1991 |
| JP | H03-194526 A | 8/1991 |
| JP | H04-91338 U | 8/1992 |
| JP | H07-40100 B2 | 5/1995 |
| JP | H11-064817 A | 3/1999 |
| JP | H11-119186 A | 4/1999 |
| JP | 2000-305060 A | 11/2000 |
| JP | 2006-330100 A | 12/2006 |
| JP | 2009-080396 A | 4/2009 |
| JP | 2009-210965 A | 9/2009 |
| JP | 2010-266551 A | 11/2010 |
| WO | 2009/081542 A1 | 7/2009 |

OTHER PUBLICATIONS

Japan Patent Office, Japanese Office Action (Notice of Reason for Rejection) for counter-part Japanese Patent Application No. 2010-131401, dated Mar. 18, 2014.
Japan Patent Office, Notice for reasons for rejection issuded to Japanese Patent Application No. 2010-019079, dated Jan. 7, 2014.
International Search Report for PCT/JP2011/052451, dated Apr. 5, 2011.

* cited by examiner

Fig.1
(a)
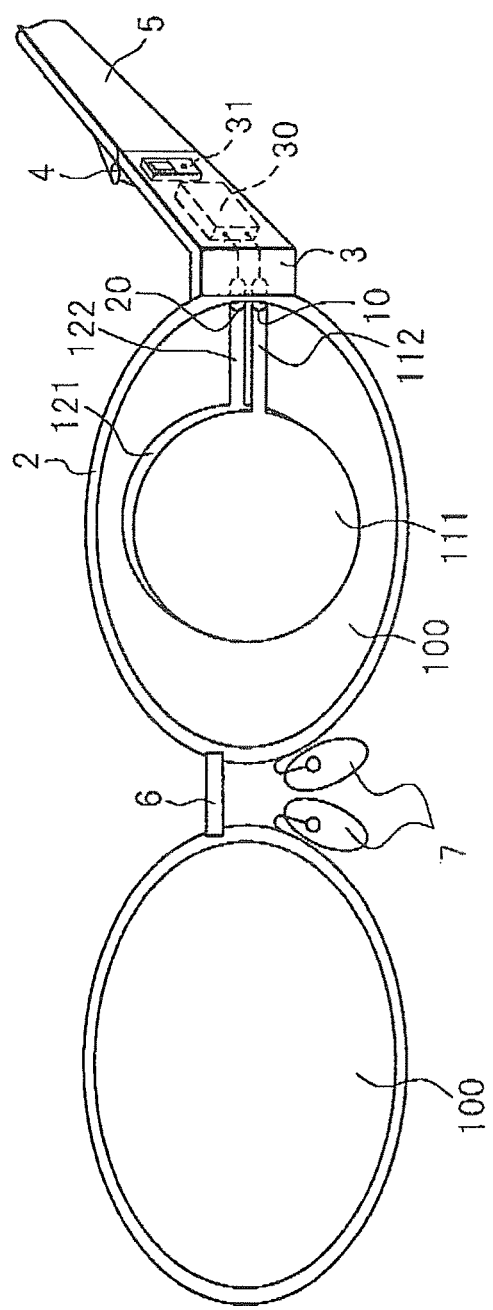
(b)
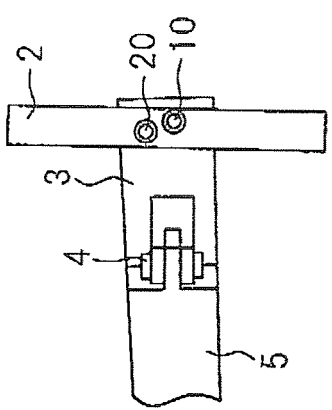

Fig.8
(a)
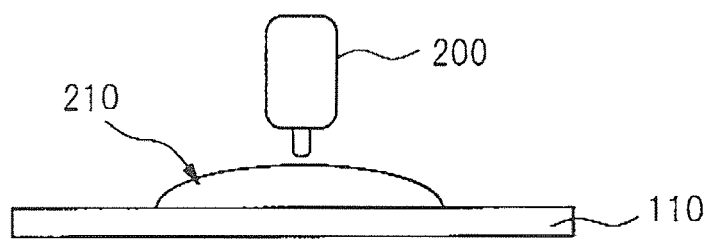
(b)
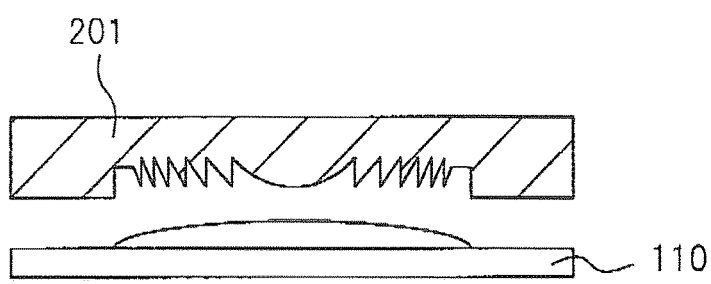
(c)
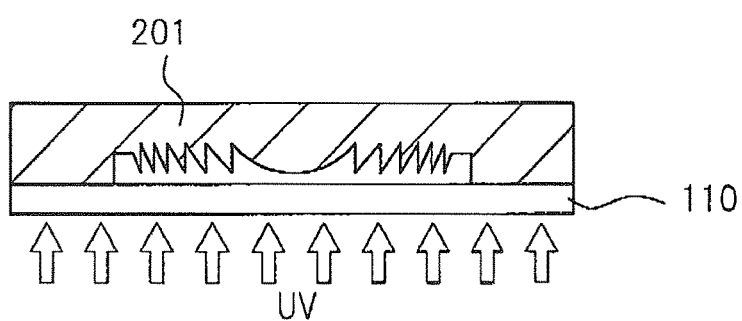
(d)
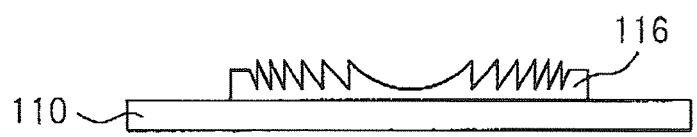

Fig.9
(a)
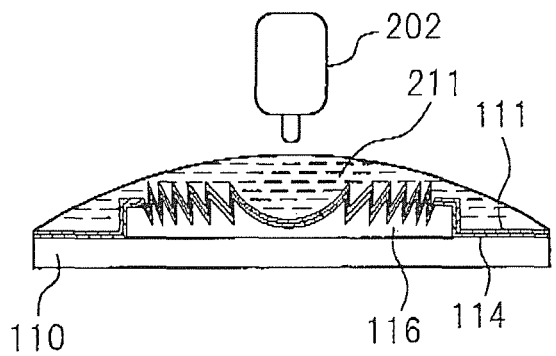
(b)
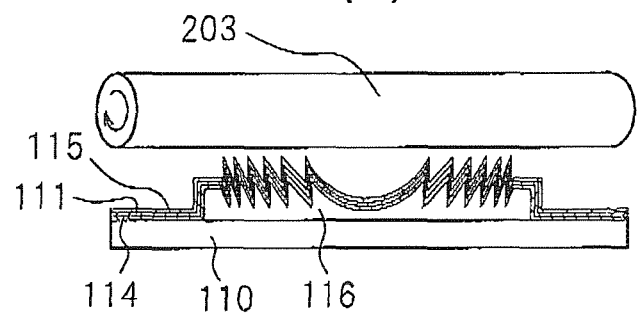
(c)
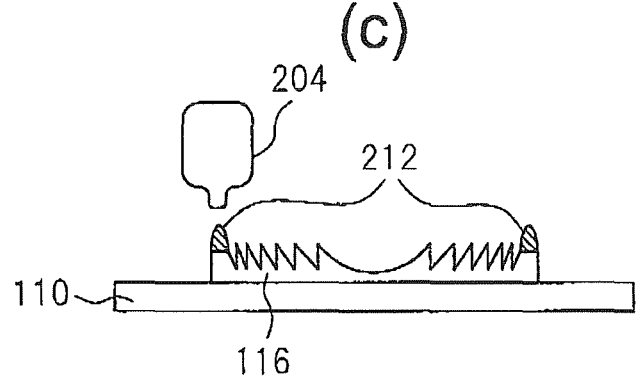
(d)
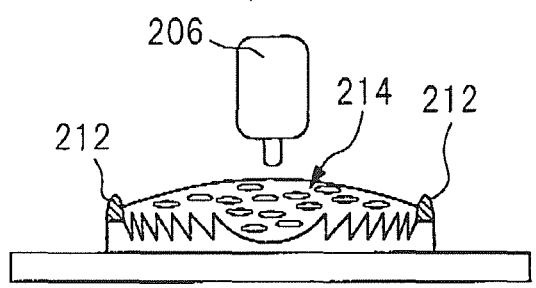

Fig.10
(a)
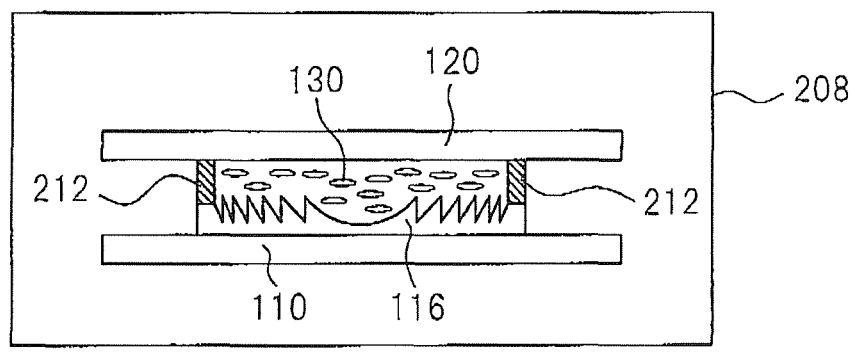
(b)
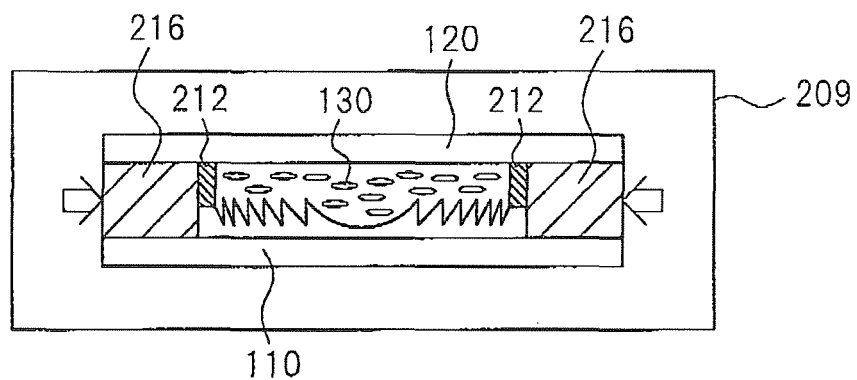
(c)
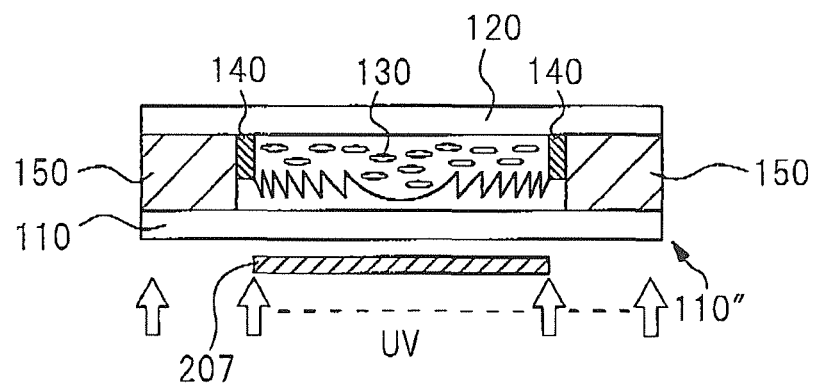

Fig.14
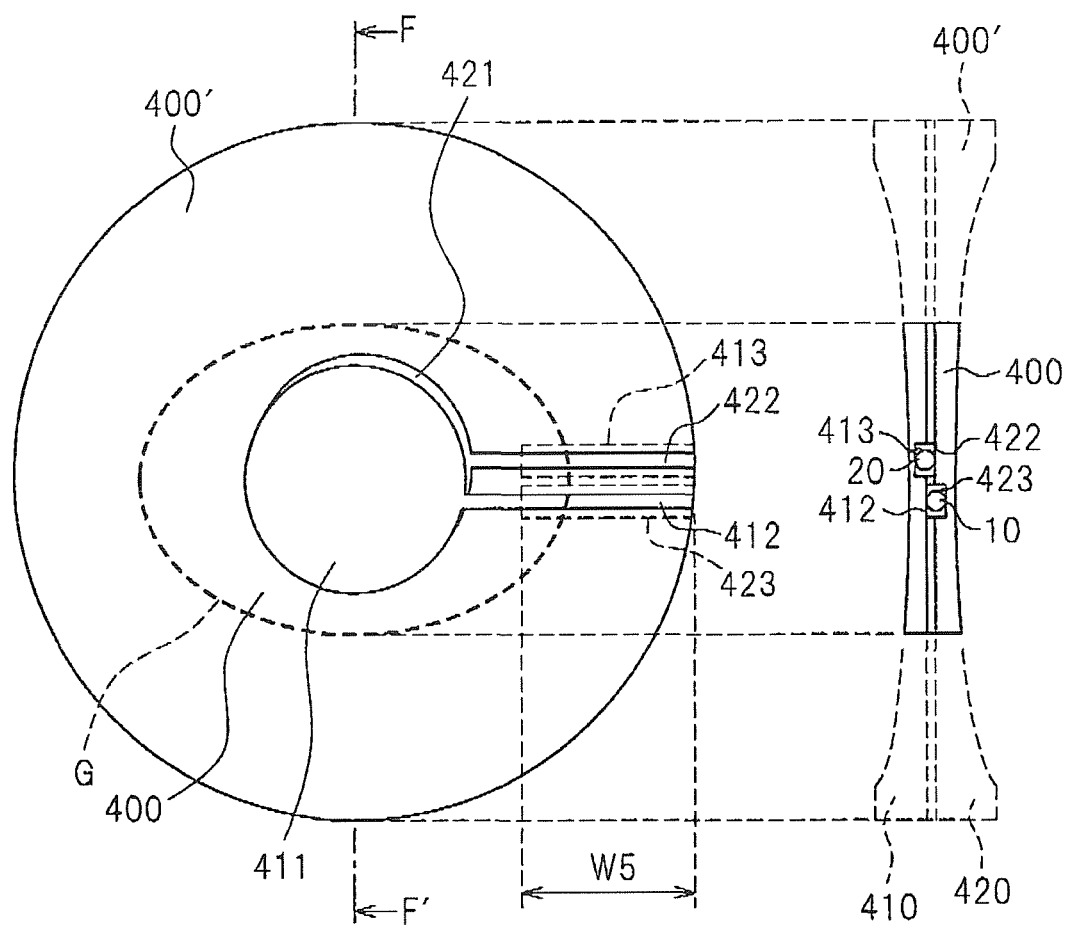 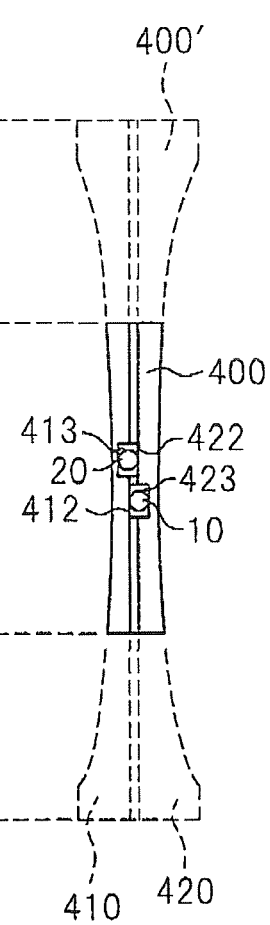

Fig.18
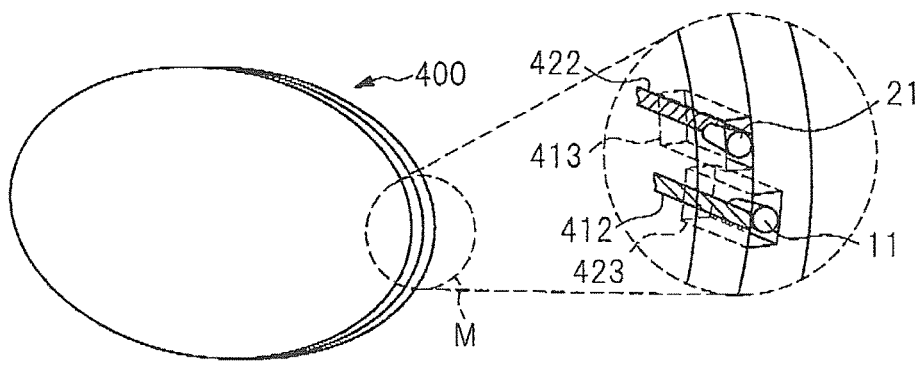
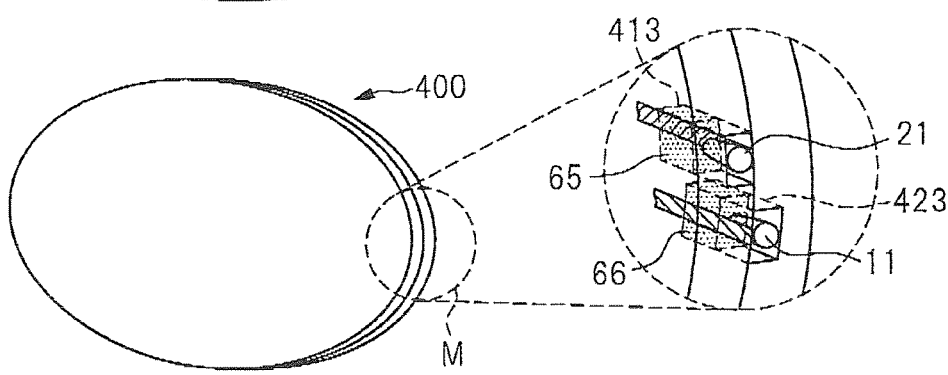
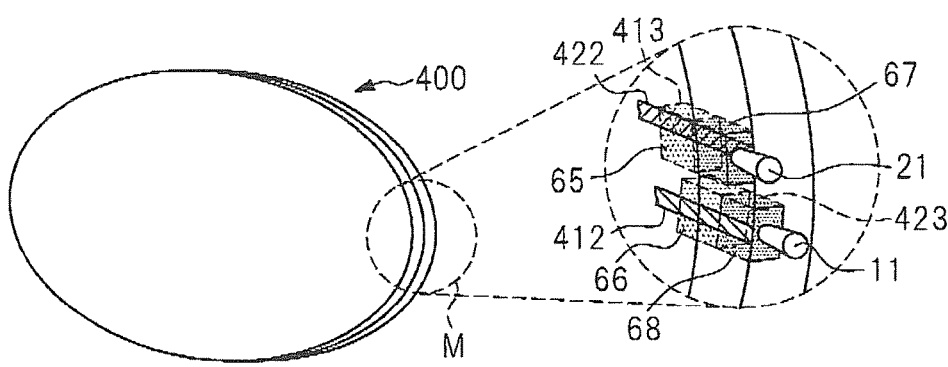
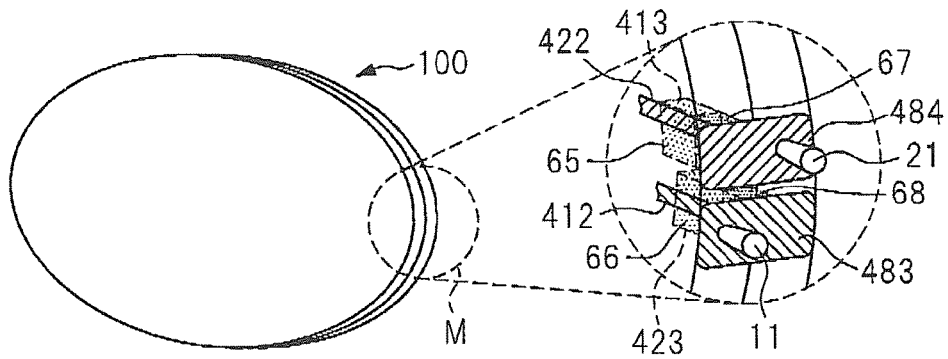

Fig.24
(a)
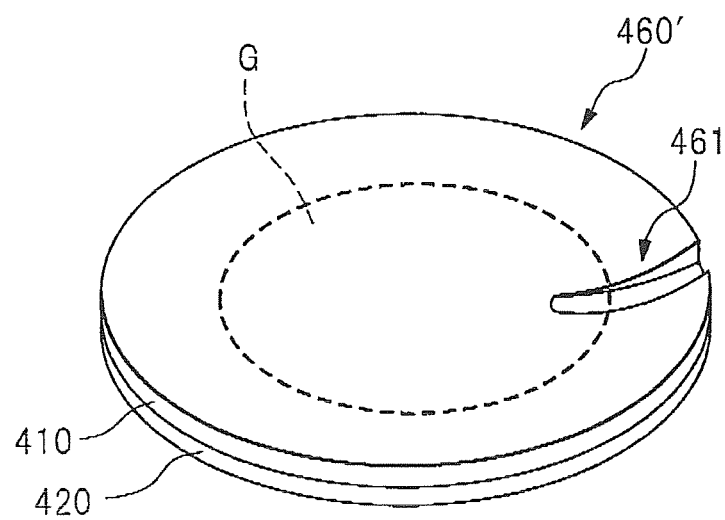
(b)
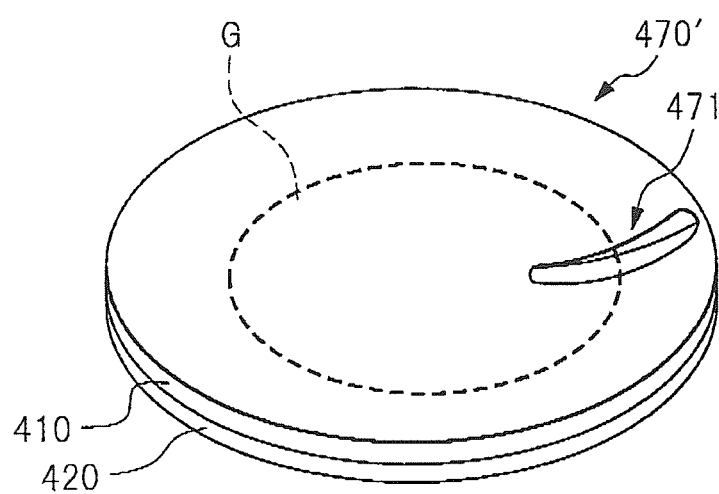

Fig.26
(a)
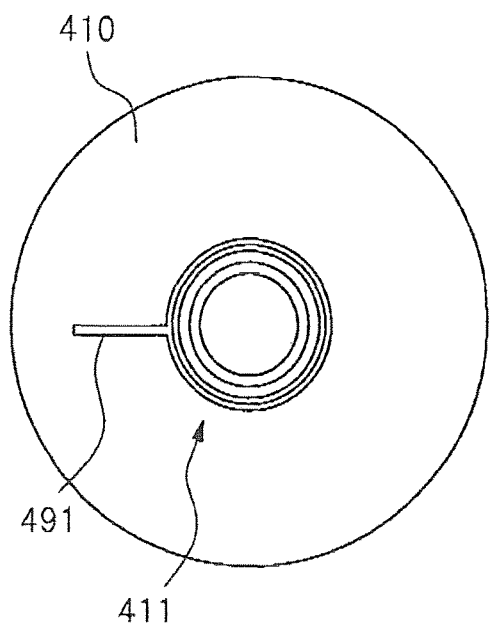
(b)
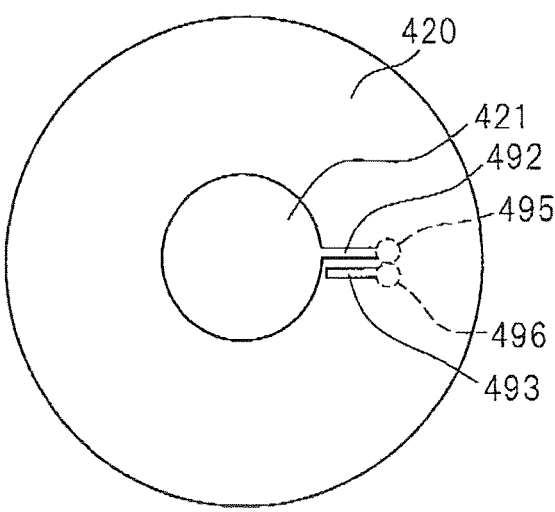
(c)
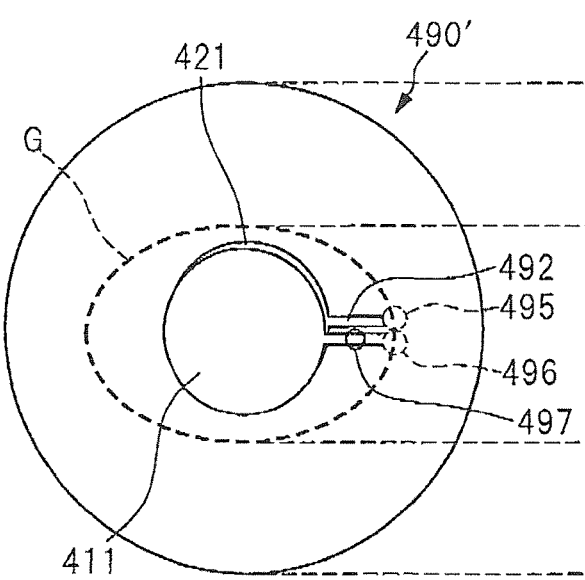
(d)
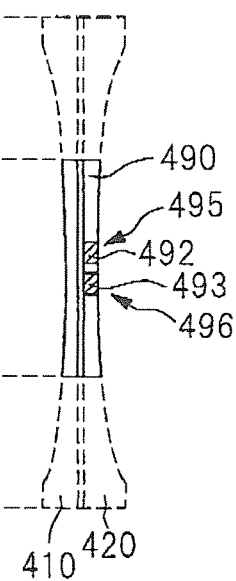

Fig.27
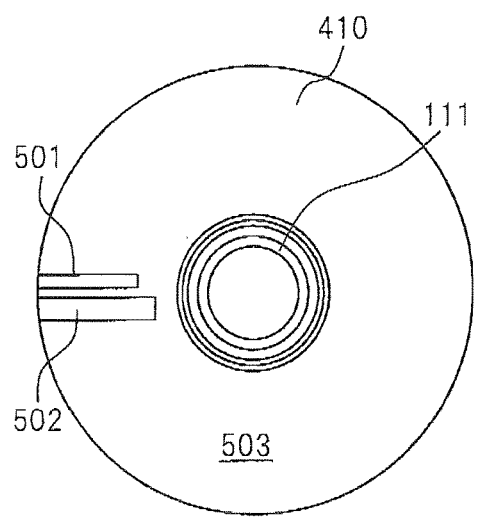
(a)
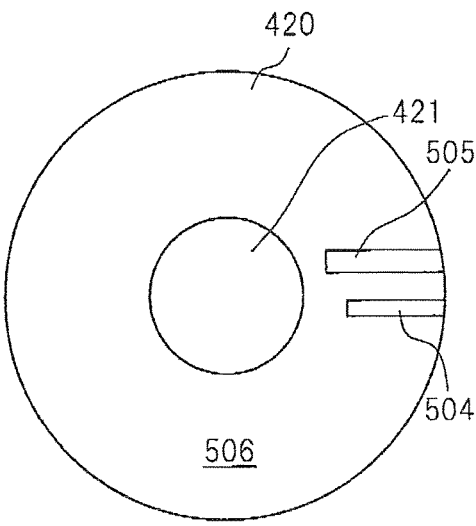
(b)
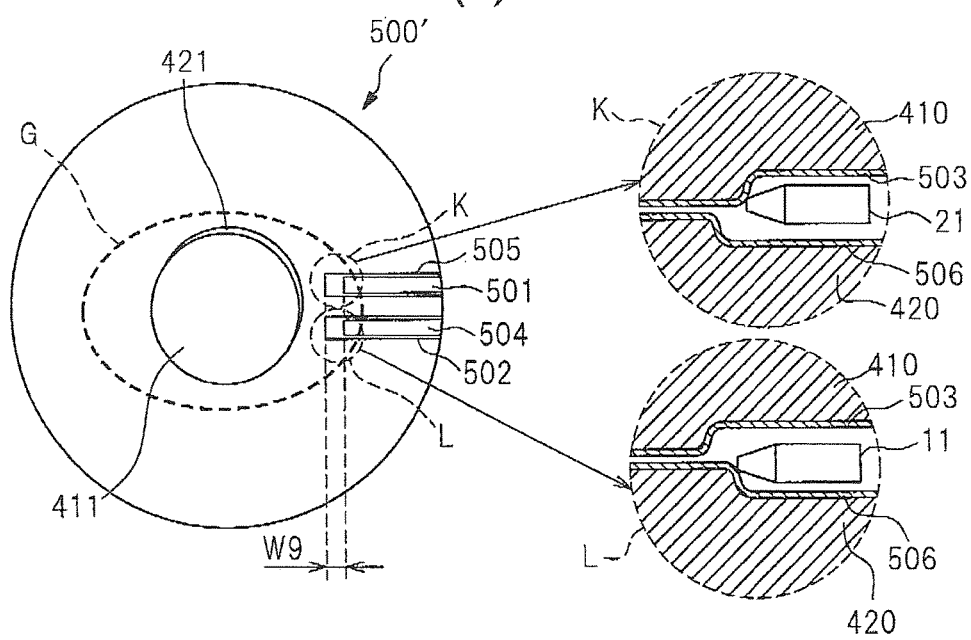
(c)

Fig.28
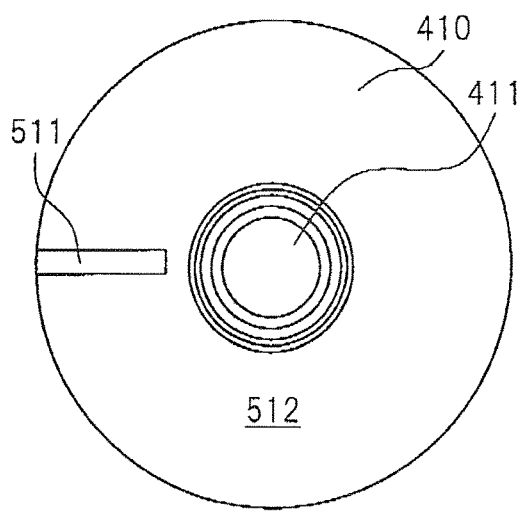
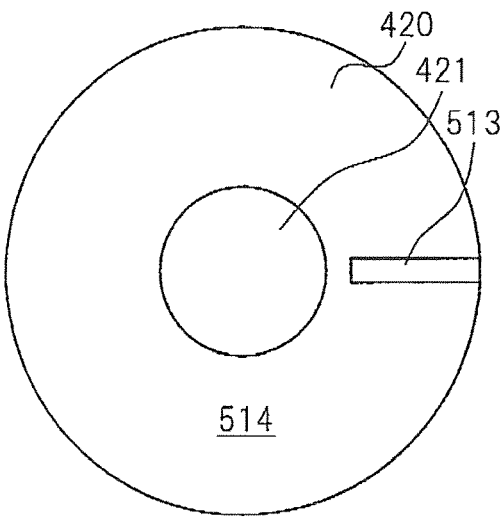
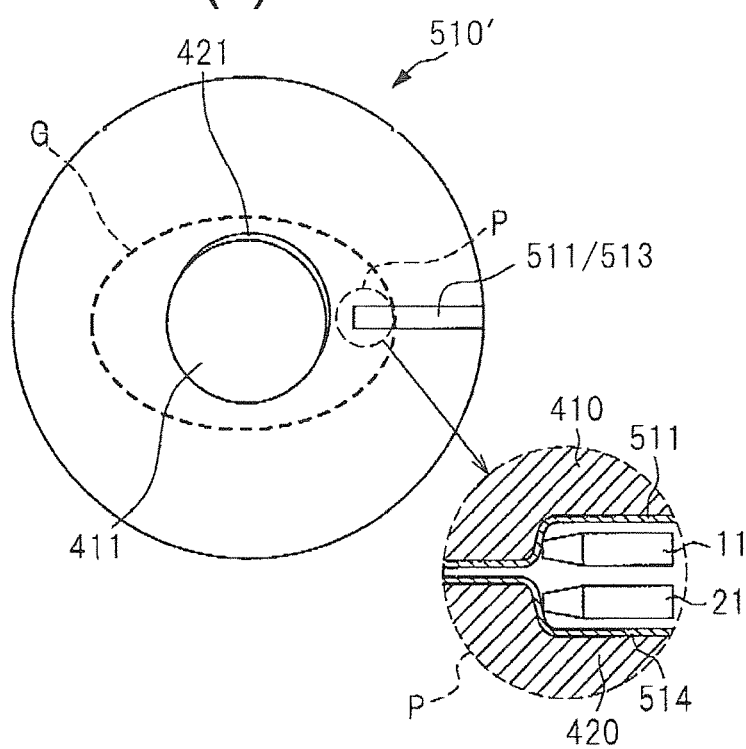
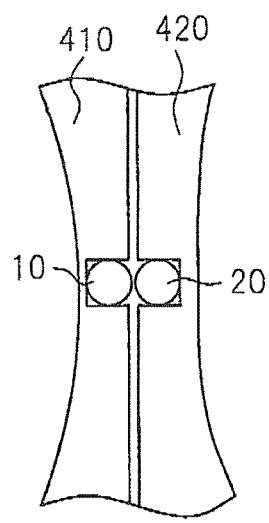

ELECTRONIC EYEGLASS AND LIQUID CRYSTAL LENS PRODUCTION METHODS

TECHNICAL FIELD

The present invention relates to electronic eyeglass and liquid crystal lens production methods, and more particularly to methods for producing electronic eyeglasses and liquid crystal lenses that can be used, for example, as eyeglass lenses by mounting them in an eyeglass frame.

BACKGROUND

It is known to provide eyeglasses of the type in which lenses, each capable of changing color in response to an applied voltage, are mounted in an eyeglass frame and are connected to a power supply separately provided within the eyeglass frame (refer, for example, to patent document 1).

It is also known to provide a method for producing a liquid crystal display panel, in which a liquid crystal is injected through a tiny injection port provided in a spacer interposed between substrates and, after sealing the injection port upon completion of the injection of the liquid crystal, an adhesive material is injected into the gap created outside the spacer and is cured to complete the production (refer, for example, to patent document 2).

However, if a path in the liquid crystal display remains that was used for injecting the liquid crystal, since this path has different optical characteristics from those of the other portions, there are problems when it is used, for example, as an eyeglass lens, the lens wearer may be uncomfortable when using them. There has also been the problem that, when cutting the lens to fit the shape of the eyeglass frame, since the liquid crystal injection path, if left in the panel, cannot be cut, the outer shape of the lens cannot be obtained as desired to fit the shape of the eyeglass frame.

It is also known to provide a method for producing a large-area liquid crystal display panel wherein in order to maintain the gap between two substrates, two sealing agents are placed one inside the other and, after dropping a liquid crystal material into the space inside the inner sealing agents, the substrates are bonded together to form a liquid crystal panel, after which the outer sealing agents is removed to complete the production (refer, for example, to patent document 3).

The liquid crystal dropping method eliminates the need for forming a liquid crystal injection path in the liquid crystal display panel but, when using the panel as an eyeglass lens or the like, the outer shape of the liquid crystal panel needs to be edged to fit the eyeglass frame of any given shape. Therefore, it is difficult to predetermine the positions of the two sealing agents.

There is also disclosed a light-adjusting display structure comprising a pair of transparent substrates, wherein a slot is formed in one of the two transparent substrates, and a feed member is inserted in the slot from one end of the light-adjusting display structure to feed the light-adjusting display structure (refer, for example, to patent document 4).

Patent document 1: Japanese Utility Patent Publication No. H03-35523 (FIGS. 1 and 3)

Patent document 2: Japanese Unexamined Patent Publication No. S52-28296 (FIGS. 1 and 2)

Patent document 3: Japanese Unexamined Patent Publication No. 2000-305060 (FIGS. 6 and 9)

Patent document 4: Japanese Utility Patent Publication No. H04-91338 (FIG. 1)

SUMMARY

Accordingly, it is an object of the present invention to provide electronic eyeglass and liquid crystal lens production methods which solve the above problems.

It is also an object of the present invention to provide electronic eyeglass and liquid crystal lens production methods that eliminate the need for forming a liquid crystal injection path in the liquid crystal lens, while making provisions to be able to sufficiently maintain a prescribed gap between substrates.

It is a further object of the present invention to provide electronic eyeglass and liquid crystal lens production methods that make it possible to electrically connect an eyeglass frame to the liquid crystal lens in a reliable manner through an edge face of the lens even when the lens is cut to fit the eyeglass frame of any given shape.

A liquid crystal lens production method includes the steps of placing a sealing agent so as to form a closed planar region on at least one of first and second transparent substrates, dropping a liquid crystal material into an inside space enclosed by the sealing agent, bonding the other of the transparent substrates onto the one transparent substrate on which the liquid crystal material has been dripped, and filling a resin into a space created outside the sealing agent.

Preferably, in the liquid crystal lens production method, the step of filling the resin into the space created outside the sealing agent is carried out after the step of bonding together the first and second transparent substrates.

Preferably, the liquid crystal lens production method further includes the step of curing the sealing agent before the step of filling the resin into the space created outside the sealing agent.

Preferably, in the liquid crystal lens production method, the step of bonding together the first and second transparent substrates is carried out after the step of filling the resin into the space created outside the sealing agent.

Preferably, the liquid crystal lens production method further includes the step of curing the sealing agent after the step of bonding together the first and second transparent substrates.

Preferably, the liquid crystal lens production method further includes the step of forming a filling layer by curing the filled resin.

Preferably, the liquid crystal lens production method further includes the step of forming an optical structure on at least one of the first and second transparent substrates.

Preferably, the liquid crystal lens production method further includes the step of performing lens forming by grinding and polishing at least one of the first and second transparent substrates.

Preferably, the liquid crystal lens production method further includes the step of performing lens forming by cutting the first and second transparent substrates.

Preferably, the liquid crystal lens production method further includes the step of placing the optical structure with the center thereof aligned with the center of the first and second transparent substrates and performing lens forming by displacing the center of the optical structure from the center of the liquid crystal lens to be finally obtained.

Preferably, the liquid crystal lens production method further includes the step of placing the optical structure with the center thereof displaced from the center of the first and second transparent substrates and performing lens forming so that the center of the liquid crystal lens to be finally obtained coincides with the center of the first and second transparent substrates.

Preferably, in the liquid crystal lens production method, the first and second transparent substrates are each provided with an electrode for applying voltage to a liquid crystal a connecting line connected to the electrode, and a recessed portion or an opening formed in the first transparent substrate or the second transparent substrate so that at least a portion of the connecting line is located inside the recessed portion or opening.

Preferably, the liquid crystal lens production method further includes, after the step of performing lens forming by cutting the first and second transparent substrates, the step of inserting a connecting terminal for applying voltage to the electrode into the recessed portion or opening through an edge face of the first and second transparent substrates, and electrically connecting the connecting terminal to the connecting line.

Preferably, in the liquid crystal lens production method, in the step of filling the resin into the space created outside the sealing agent, the resin is also filled into the recessed portion or opening.

Preferably, the liquid crystal lens production method further includes the step of filling a conductive material into the recessed portion or opening, the conductive material being electrically connected to the connecting line and in contact with the connecting terminal.

Preferably, the liquid crystal lens production method further includes the step of placing a connecting portion which is electrically connected to the conductive material and which contacts the connecting terminal.

Preferably, in the liquid crystal lens production method, the recessed portion or opening has a prescribed width so that the recessed portion or opening is located in a lens edge face after the step of lens forming in order for the lens to be mounted in any one of a plurality of kinds of eyeglass frames.

An electronic eyeglass production method includes the step of mounting the liquid crystal lens, fabricated in accordance with the liquid crystal lens production method, in an eyeglass frame having the voltage application connecting terminal in such a manner that the connecting terminal can be electrically connected to the electrode provided in the liquid crystal lens.

According to the electronic eyeglass and liquid crystal lens production methods, since the need for forming a liquid crystal injection path in the liquid crystal lens is eliminated by using the liquid crystal dropping method, and since the space created outside the sealing agent is filled with a resin, the substrates of the lens can be held firmly and accurately a prescribed distance apart from each other.

Further, according to the electronic eyeglass and liquid crystal lens production methods, since electrical connections on the eyeglass frame can be made through the edge face of the liquid crystal lens, there is no need to form connecting wiring lines on the front or back surface of the lens, and the liquid crystal lens can be made to function as an electronic eyeglass while retaining good design freedom.

Furthermore, according to the electronic eyeglass and liquid crystal lens production methods, if the liquid crystal lens is processed to fit the shape of any given eyeglass frame, since electrical connections to the eyeglass frame can be made through the edge face of the lens, the liquid crystal lens can be made to function as an electronic eyeglass while retaining good design freedom.

BRIEF DESCRIPTION OF THE DRAWINGS

FIG. 1 is a schematic diagram showing a portion of electronic eyeglasses 1.

FIG. 8 is a diagram (part 1) for explaining the liquid crystal lens production process.

FIG. 9 is a diagram (part 2) for explaining the liquid crystal lens production process.

FIG. 10 is a diagram (part 3) for explaining the liquid crystal lens production process.

FIG. 14 is a diagram for explaining a finished lens 400' and an edged lens 400.

FIG. 18 is a diagram illustrating how the spring connectors are connected to the edged lens 400.

FIG. 24 is a perspective view of the finished lens 460' shown in FIG. 23, and an alternative finished lens 470'.

FIG. 26 is a diagram showing a finished lens 490'.

FIG. 27 is a diagram showing a finished lens 500'.

FIG. 28 is a diagram showing a finished lens 510'.

DESCRIPTION OF EMBODIMENTS

Figure 2:
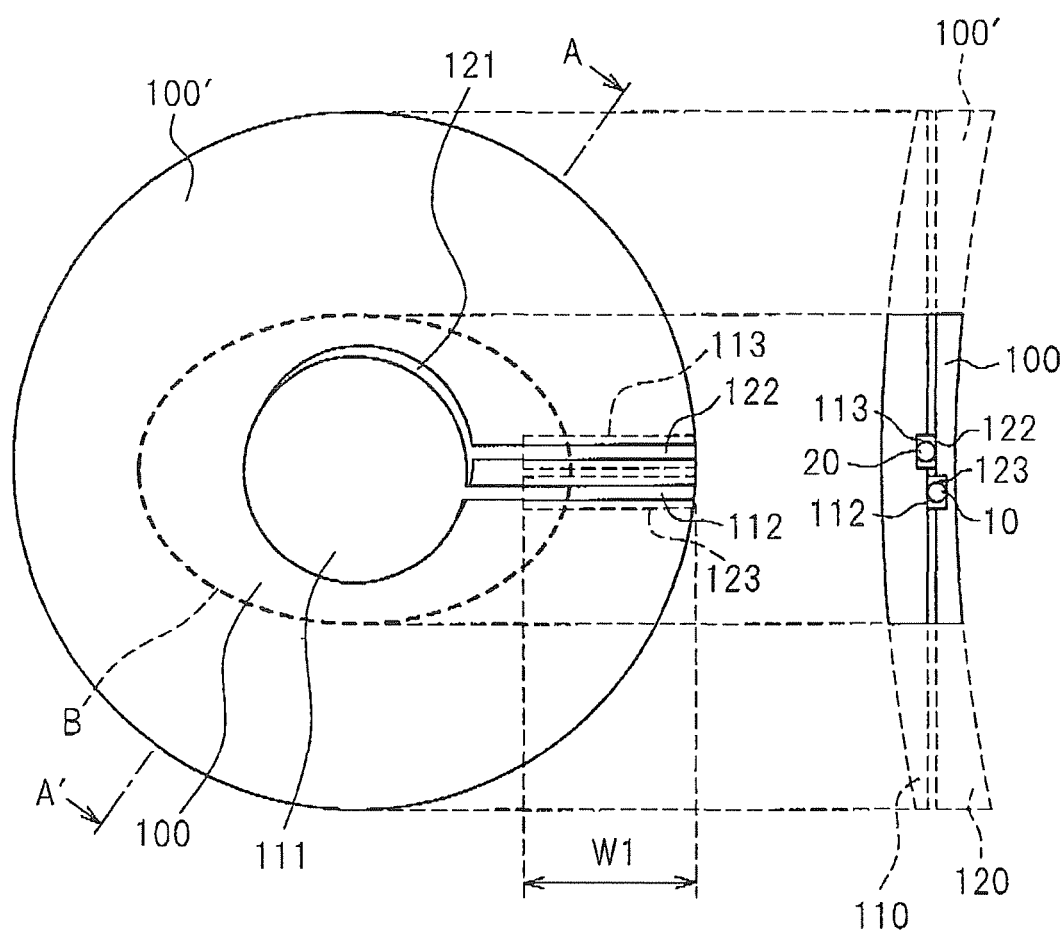
FIG. 2 is a diagram for explaining a finished lens 100' and an edged lens 100.

Electronic eyeglass and liquid crystal lens production methods will be described below with reference to the drawings. It will, however, be noted that the technical scope of the present invention is not limited to the specific embodiments described herein but extends to the inventions described in the appended claims and their equivalents.

In the following description, a "blank lens" that has yet to be ground or polished, a "finished lens", and a "semi-finished lens" will each be referred to as a "pre-edging lens", while a lens generated by edging a "pre-edging lens" will be referred to as an "edged lens". The "finished lens" refers to a lens with both sides ground and polished to the desired lens form, while the "semi-finished lens" refers to a lens with only one side ground and polished. Further, a "blank lens", a "finished lens", a "semi-finished lens", and an "edged lens", if such lenses contain a liquid crystal lens structure, will be collectively referred to as "liquid crystal lenses".

FIG. 1 is a schematic diagram showing a portion of electronic eyeglasses 1 as an example of the use of edged lenses.

As shown in FIG. 1(a), the electronic eyeglasses 1 include an eyeglass frame 2, end pieces 3, hinges 4, temples 5, a bridge 6, and nose pads 7, and a pair of edged lenses 100 is mounted into the eyeglass frame 2. The end piece 3 contains spring connectors 10 and 20 as terminals for electrically connecting to the liquid crystal lens structure 50 contained in the edged lens 100, a voltage supply 30 including a battery as a power supply connected to the spring connectors 10 and 20, a DIP switch 31, etc.

FIG. 1(b) is a diagram showing the spring connectors 10 and 20 as viewed from the inside of the eyeglass frame 2. As shown in FIG. 1(b), the spring connectors 10 and 20 are provided in such a manner as to be insertable into first and second recessed portions 113 and 123 formed in the edged lens 100 as will be described later. The inside of the eyeglass frame 2 may be provided with a groove into which the ridge of the edged lens 100 fits. The term "ridge" refers to the raised portion formed around the periphery of the lens so as to fit into the inside groove of the eyeglass frame 2 when attaching the lens to the eyeglass frame 2, and usually has a height of about 0.5 to 1 mm.

The liquid crystal lens structure 50, which includes a first transparent electrode 111 deposited over a Fresnel lens surface and a second transparent electrode 121 disposed opposite the first transparent electrode 111, is formed in the center of the edged lens 100, as will be described later. when no voltage is applied between the first transparent electrode 111 and the second transparent electrode 121, the liquid crystal lens structure 50 remains inoperative, and the electronic eyeglasses 1 can thus provide the lens power that the edged lens 100 originally has When a prescribed voltage from the voltage supply 30 is applied between the first transparent electrode 111 and the second transparent electrode 121, the liquid crystal lens structure 50 operates as a lens having prescribed power; as a result, in the portion of the edged lens 100 where the liquid crystal lens structure 50 is contained, the liquid crystal lens structure 50 operates so as to change the focal length of that portion of the edged lens 100.

For example, the edged lens 100 itself may be designed to have a lens form that provides power to focus on a distant object, with provisions made so that when the liquid crystal lens structure 50 is inoperative, the electronic eyeglasses are used as glasses for distance viewing, while when the liquid crystal lens structure 50 is activated, the electronic eyeglasses are used as glasses for near viewing. If provisions are made to be able to turn on and off the voltage application to the liquid crystal lens structure 50 by the DIP switch 31 provided on the electronic glasses 1, the electronic glasses 1 can be operated as bifocals whose focal length can be switched as desired by the DIP switch 31. The type of eyeglasses that can be achieved with the edged lenses is not limited to the above example, but the edged lenses can be applied to various kinds of eyeglasses, examples including electronic eyeglasses for farsightedness, whose near viewing power can be changed in multiple steps, electronic eyeglasses for nearsightedness, whose distance viewing power can be changed in multiple steps, glasses for correcting astigmatism or reading glasses for the aged, and glasses for vision training.

Figure 3:
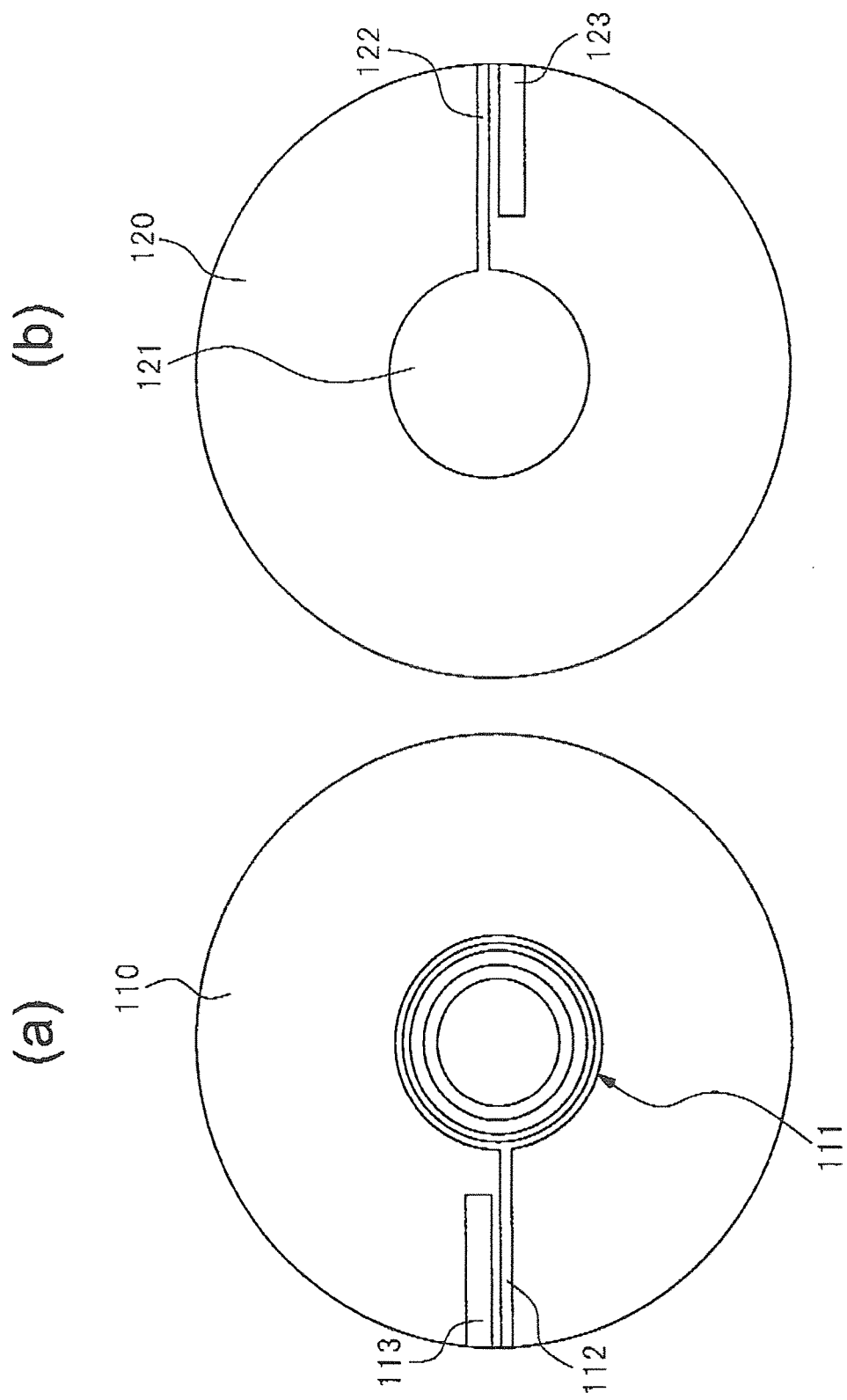
FIG. 3 is a diagram showing two transparent substrates constituting a blank lens 100".

FIGS. 2 and 3 are diagrams for explaining the edged lens 100.

FIG. 2(a) is a plan view of a finished lens 100' from which the edged lens 100 to be mounted to the electronic eyeglasses 1 of FIG. 1 is generated by edging its outer shape along dashed line B to fit the eyeglass frame 2 of the electronic eyeglasses 1, and FIG. 2(b) is a side view of the edged lens 100.

Figure 4:
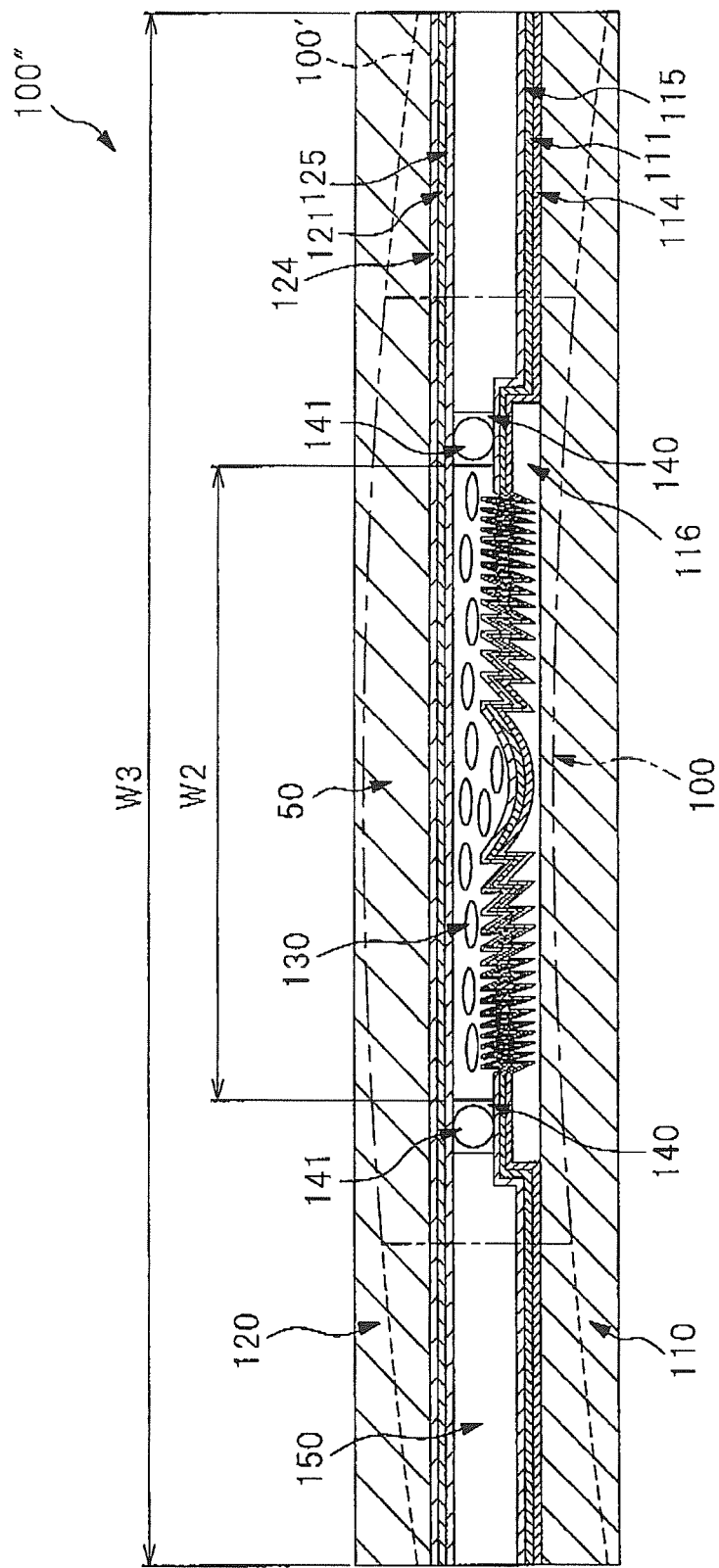
FIG. 4 is a cross-sectional view of the blank lens 100".

FIG. 3(a) is a diagram showing a first transparent substrate 110 forming the blank lens, and FIG. 3(b) is a diagram showing a second transparent substrate 120 forming the blank lens. The first and second transparent substrates 110 and 120 are cylindrically shaped substrates. The first and second transparent substrates 110 and 120 are bonded together so as to seal therein a sealing agent 140, liquid crystal layer 130, etc., as shown in FIG. 4, and then ground and polished so that the outer shape has a desired lens form (for example, a concave lens), thus producing the pre-edging finished lens 100' as shown in FIG. 2(a). The details of the production method will be described later.

As shown in FIG. 3(a), the first recessed portion 113 is formed in the first transparent substrate 110 on the side thereof to be connected to the second transparent substrate 120. The first transparent electrode 111 formed by sputtering ITO (indium tin oxide), as well as a first connecting line 112 connected to the first transparent electrode 111, is located on a Fresnel lens structure formed on the first transparent substrate 110.

As shown in FIG. 3(b), the second recessed portion 123 is formed in the second transparent substrate 120 on the side thereof to be connected to the first transparent substrate 110. Further, a second connecting line 122 is formed in the position opposite the first recessed portion 113, while the second recessed portion 123 is formed in the position opposite the first connecting line 112. The second transparent electrode 121 formed by sputtering ITO and the second connecting line 122 connected to the second transparent electrode 121 are located on the second transparent substrate 120.

Since the first and second transparent substrates 110 and 120 formed with the respective recessed portions, before forming the transparent electrodes, etc., are identical in shape, the step of depositing films on the respective substrates is also identical, and hence the production of the blank lens 100" to be described later can be accomplished easily and at relatively low cost.

As shown in FIG. 2(b), the first spring connector 10 attached to the eyeglass frame 2 is inserted into the second recessed portion 123 through the edge face of the edged lens 100 and brought into contact with the first connecting line 112 located inside the second recessed portion 123. Since the side face of the forward end 11 of the first spring connector 10 is pressed onto the first connecting line 112 located inside the second recessed portion 123 by the spring force exerted by the spring built into the first spring connector 10, the electrical conduction between the first spring connector 10 and the first connecting line 112 is ensured (see FIG. 6).

Likewise, as shown in FIG. 2(b), the second spring connector 20 attached to the eyeglass frame 2 is inserted into the first recessed portion 113 through the edge face of the edged lens 100 and brought into contact with the second connecting line 122 located inside the first recessed portion 113. Since the side face of the forward end 21 of the second spring connector 20 is pressed onto the second connecting line 122 located inside the first recessed portion 113 by the spring force exerted by the spring built into the second spring connector 20, the electrical conduction between the second spring connector 20 and the second connecting line 122 is ensured (see FIG. 6).

While the first and second recessed portions 113 and 123 have each been formed in a rectangular shape of length w1, it will be appreciated that the shape and length of the first and second recessed portions 113 and 123 are not limited to any specific shape or length, but each recessed portion may be formed, for example, in a circular or elliptical shape or in a triangular or other polygonal shape. Further, the width of each recessed portion may be suitably chosen according to the diameter, etc. of the spring connector to be inserted therein. Furthermore, each recessed portion may be formed as an opening passing through the first or second transparent substrate 110 or 120 from one side through to the other side thereof. The opening may be formed in a rectangular shape of length w1 in the same manner as the recessed portion, but may not be limited to any specific shape or length; for example, the opening may also be formed in a circular or elliptical shape or in a triangular or other polygonal shape.

FIG. 4 is a cross-sectional view of the blank lens 100". In FIG. 4, dashed lines indicate the outer shape of the finished lens 100', and correspond to the AA' cross section in FIG. 2(a).

As shown in FIG. 4, the blank lens 100" comprises the first transparent substrate 110, the second transparent substrate 120, the sealing agent 140 and filling layer 150 sandwiched between the first and second transparent substrates 110 and 120, and the liquid crystal lens structure 50.

The liquid crystal lens structure 50 includes the first transparent substrate 110, the second transparent substrate 120, the Fresnel lens structure 116, and the liquid crystal layer 130 sealed by the sealing agent 140. The liquid crystal layer 130 is formed using a homogeneously aligned liquid crystal, but use may be made of a vertically aligned liquid crystal, twisted nematic liquid crystal, hybrid aligned liquid crystal, polymer-containing liquid crystal, or cholesteric liquid crystal.

On the first transparent substrate 110, there is formed, in addition to the Fresnel lens structure 116, a stack of layers comprising a first gas barrier layer 114 ($SiO_2$, thickness 200 nm) for preventing gases generated from the transparent substrate from infiltrating into the liquid crystal layer 130, the first transparent electrode 111 (ITO, thickness 50 nm), and a first alignment film 115 (thickness 50 nm) overlying the first transparent electrode 111. The first gas barrier layer 114 here may be formed so as to underlie the Fresnel lens structure 116.

On the second transparent substrate 120, there are formed one on top of another a second gas barrier layer 124 ($SiO_2$, thickness 200 nm) for preventing gases generated from the transparent substrate from infiltrating into the liquid crystal layer 130, the second transparent electrode 121 (ITO, thickness 50 nm) as a planar transparent electrode disposed opposite the first transparent electrode 111, and a second alignment film 125 (thickness 50 nm) overlying the second transparent electrode 121. To prevent accidental short-circuiting between the top and bottom transparent electrodes, an insulating film layer may be provided on at least either one of the first and second transparent electrodes 111 and 121.

A plurality of spacer members 141 (diameter 10.5 μm) formed from a resin or silica are mixed into the sealing agent 140 in order to maintain the spacing between the first and second transparent electrodes 111 and 121 constant. Further, the filling layer 150 formed from a transparent resin is interposed between the first and second transparent electrodes 111 and 121 in the space outside the sealing agent 140 in order to maintain the spacing between the first and second transparent electrodes 111 and 121 constant.

The first and second transparent substrates 110 and 120 are each formed from a cylindrically shaped polycarbonate material of thickness 5 mm, but the thickness is not limited to this particular value, nor is the material limited to polycarbonate; for example, an acrylic, urethane, or other plastic material may be used, or a glass substrate may be used. While the substrates are shown as being planar in shape, what matters is the bonding gap, and the shape is not limited to a planar shape; for example, curved substrates may be bonded together. The Fresnel lens structure 116 is formed using an acrylic material, but use may be made of other optical material such as a cyclic olefin--based transparent resin, a radically polymerized acrylic-based US-curable resin, a cationic polymerized. epoxy-based US-curable resin, a thermosetting resin, or an inorganic/organic hybrid material. When forming the Fresnel lens structure 116 using a thermosetting resin, at least the substrate on the side exposed to ultraviolet radiation needs to be formed from a material permeable to ultraviolet radiation.

In FIG. 4, w2 indicates the width of the liquid crystal layer in the liquid crystal lens structure 50, and in the example of FIG. 4, w2=20 mm; on the other hand, w3 indicates the outer dimension of the blank lens 100" and the finished lens 100', and in the example of FIG. 4, w3=75 mm. However, these values are only examples, and other suitable values may be employed.

In FIG. 4, it should be noted that, for convenience of explanation, the thickness of each substrate and the relative thicknesses of the layers are not necessarily drawn to scale. Further, in FIG. 4, the outer shape of the edged lens 100 to be mounted to the eyeglass frame 2 is shown by semi-dashed lines.

Figure 5:
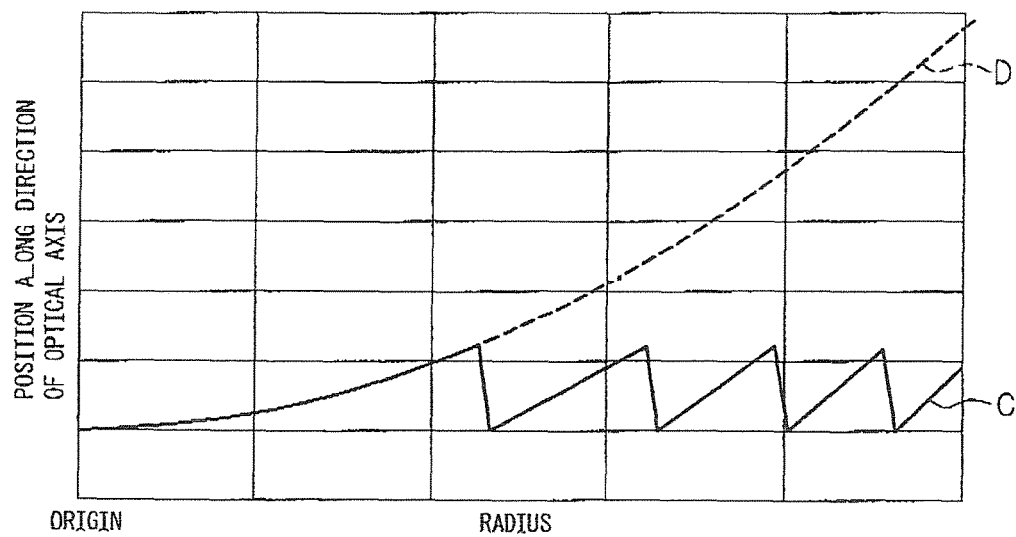
FIG. 5 is a diagram for explaining the structure of a Fresnel lens surface generated by a liquid crystal lens structure.

FIG. 5 is a diagram for explaining the structure of the Fresnel lens surface generated by the liquid crystal lens structure.

FIG. 5 shows a cross section of the Fresnel lens surface taken along the radial direction with the vertex of the Fresnel lens surface (i.e., the point on the lens surface that lies on the optical axis) as the origin. In the figure, the abscissa represents the position taken in the radial direction, and the ordinate represents the position taken in the direction of the optical axis.

Dashed line D in FIG. 5 indicates the lens surface that defines the original lens characteristics of the liquid crystal lens structure 50. The lens surface is designed as a continuous curved surface symmetrical about the optical axis, as in the conventional lens. Then, by providing steps on the lens surface so that the position on the lens surface, taken in the direction of the optical axis, coincides with the position of the vertex, the cross-sectional shape C of the Fresnel structure shown in FIG. 5 is generated (each slanted face of the Fresnel structure 116 is shown as a straight line in the figure for convenience of illustration, but actually it is curved like the dashed line D). This results in the generation of the Fresnel lens surface having a plurality of zones divided by the steps. In FIG. 5, the Fresnel lens structure is shown as having four zones, but the number of zones shown here is only one example, and is not limited to four.

Figure 6:
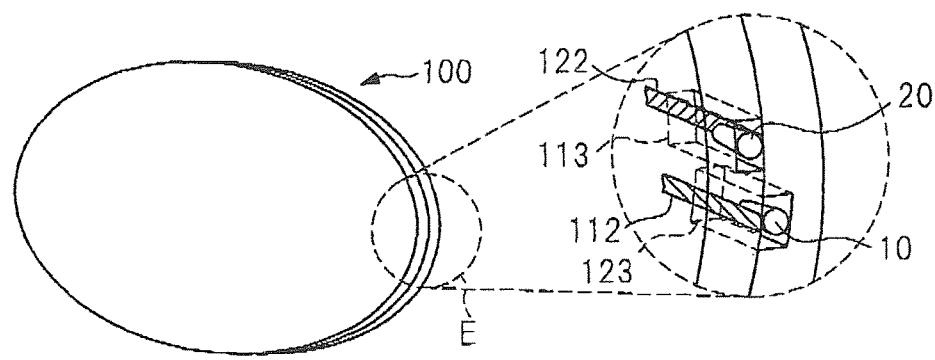
FIG. 6 is a diagram illustrating how spring connectors are connected to the edged lens 100.

FIG. 6 is a diagram illustrating how the spring connectors are connected to the edged lens 100.

An enlarged view of the portion of the edged lens 100 encircled by dashed line E is shown in FIG. 6. As described earlier, since the side face of the first spring connector 10 is pressed onto the first connecting line 112 located inside the second recessed portion 123 by the spring force exerted by the spring built into the first spring connector 10, the electrical conduction between the first spring connector 10 and the first connecting line 112 is ensured. Similarly, since the side face of the second spring connector 20 is pressed onto the second connecting line 122 located inside the first recessed portion 113 by the spring force exerted by the spring built into the second spring connector 20, the electrical conduction between the second spring connector 20 and the second connecting line 122 is ensured. The method of connecting the spring connectors to the edged lens 100 is not limited to the above method, but some other suitable method may be employed.

In the case of the above-described finished lens 100', if the edged lens 100 is generated by cutting the lens at any position along the width w1 of the first and second recessed portions 113 and 123 shown in FIG. 2(a), the spring connectors can be connected by inserting them through the edge face of the edged lens 100 (see FIG. 6). Accordingly, the outer shape of the edged lens 100 need not be determined in advance, and the edged lens 100 can be generated to fit the frame of any given shape.

The sequence of process steps for producing the liquid crystal lens will be described below with reference to FIGS. 7 to 10.

First, the first recessed portion 113 is formed in the cylindrically shaped first transparent substrate 110 (thickness 5 mm) by cutting, and the second recessed portion 123 is formed in the cylindrically shaped second transparent substrate 120 (thickness 5 mm) by cutting (S10).

Next, the Fresnel lens structure 116 is fabricated on the first transparent substrate 110 (S11). To produce the Fresnel lens structure 116, a photosetting resin 210 is dripped in a prescribed amount from a dispenser 200 onto the first transparent substrate 110 (see FIG. 8(a)), and the photosetting resin 210 is formed in a given shape by a mold 201 (see FIGS. 8(b) and 8(c)), after which ultraviolet rays (UV) are radiated from below the first transparent substrate 110 (see FIG. 8(c)), causing the photosetting resin 210 to cure (see FIG. 8(d)). In FIG. 8(d), the area of the cured photosetting resin 210 including the Fresnel lens structure 116 is shown as being smaller than the first transparent substrate 110, but it may be formed over the entire surface of the first transparent substrate 110.

As the photosetting resin 210, use may be made of a UV-curable acrylic resin. In an alternative method, the Fresnel lens structure may be fabricated separately, and the completed Fresnel lens structure may be bonded onto the first transparent substrate 110. Further, the Fresnel lens structure may be formed by cutting the first transparent substrate, as in the case of the first recessed portion 113, or may be formed integrally with the transparent substrate by casting or injection molding.

Next, the first gas barrier layer 114 and the second gas barrier layer 124, each of a $SiO_2$ film with a thickness of 200 nm, are formed on the first transparent substrate 110 on which the Fresnel lens structure 116 has been formed and the second transparent substrate 120, respectively (S12).

Next, an ITO film is deposited over the first gas barrier layer 114 of the first transparent substrate 110, and the deposited ITO film is patterned to form the first transparent electrode 111 and the first connecting line 112. Similarly, an ITO film is deposited over the second gas barrier layer 124 of the second transparent substrate 120, and the deposited ITO film is patterned to form the second transparent electrode 121 and the second connecting line 122 (S13).

Next, the first alignment film 115 is formed on the first transparent electrode 111 of the first transparent substrate 110, and rubbing is performed. Similarly, the second alignment film 125 is formed on the second transparent electrode 121 of the second transparent substrate 120, and rubbing is performed (S14).

The formation of each alignment film is performed, for example, by dropping a film forming material 211 in a prescribed amount from a dispenser 202 (see FIG. 9(a)), drying (baking) it in a prescribed atmosphere, and thereafter rubbing the film by using a roller 203 (see FIG. 9(b)). Each alignment film may be formed without performing such rubbing; for example, use may be made of an evaporated alignment film which is formed by evaporating an inorganic material or a photo-alignment film which is aligned by irradiation with light.

Next, to form the sealing agent 140, a photosetting resin 212 with the spacer members 141 mixed therein is dispensed from a dispenser 204 onto the first transparent substrate 110 (see FIG. 9(c)) (S15). Preferably, the sealing agent 140 is formed by using a material that, when cured, has substantially the same refractive index as the first and second transparent substrates 110 and 120. In FIGS. 9(c) and 9(d) and FIGS. 10(a) to 10(c), the first gas barrier layer 114, the first transparent electrode 111, the first alignment film 115, the second barrier layer 124, the second transparent electrode 121, and the second alignment film 125 are omitted for convenience of illustration.

Next, a liquid crystal material 214 is dripped in a prescribed amount from a dispenser 206 into the inside space enclosed by the photosetting resin 212 (S16, see FIG. 9(d)). More specifically, in this step, the one drop fill process (ODF) is employed instead of the conventional process that requires forming an injection port in the sealing agent and sealing the injection port after injecting the liquid crystal material through the injection port. In this case, since no liquid crystal injection path is left in the edged lens 100, the edged lens 100 can be generated in any desired shape, and the desired optical characteristics of the lens can be reliably maintained.

Next, the second transparent substrate 120 is laid over the first transparent substrate 110, and the two substrates are placed in a chamber 208 and bonded together in a vacuum atmosphere (see FIG. 10(a)) (S17). With this step, a closed planar region is formed on at least one of the first and second transparent substrates 110 and 120 by the sealing agent 140.

Next, the bonded structure is placed in a prescribed chamber 209, and the gap created outside the sealing agent 140 between the first and second transparent substrates 110 and 120 is filled with a transparent adhesive material 216 by capillary action in a vacuum atmosphere (see FIG. 10(b)) (S18). The transparent adhesive material used here for forming the filling layer 150 is a low-viscosity photosetting material that is transparent and that has substantially the same refractive index as the first and second transparent substrates 110 and 120. This serves to reduce the reflection loss at the interface. Further, the transmissivity of the filling layer 150 is made substantially the same as that of the liquid crystal layer 130, thus making the liquid crystal layer 130 less visible. Furthermore, to enhance the overall appearance, use may be made of a transparent refractive adhesive material 216 having the same composition and same refractive index as the photosetting resin 210 used to construct the Fresnel lens structure 116.

Next, UV rays are radiated by placing a mask 207 so as to mask the entire region of the liquid crystal layer 130, and the photosetting resin 212 and the transparent adhesive material 216 are cured to complete the formation of the sealing agent 140 and the filling layer 150 (S19). The reason that the entire region of the liquid crystal layer 130 is masked is to prevent its characteristics from changing, because the characteristics may be changed by UV radiation, depending on the liquid crystal material used. On the other hand, the formation of the filling layer 150 has the effect of enhancing the transmissivity of the lens, securing the adhesive force strong enough to withstand the forces exerted by grinding and polishing operations, and preventing abrasive material, abrasive liquid, etc., from entering inside.

The liquid crystal material 214 dripped as described above is thus sealed by the sealing agent 140 between the first and second transparent substrates 110 and 120, and forms the liquid crystal layer 130. When forming the sealing agent 140 and the filling layer 150 by curing the above resins, the entire structure may be baked in a high-temperature atmosphere after the UV radiation. This completes the production of the blank lens 100" shown, for example, in FIG. 4 (the outer shape of the lens is not formed yet).

Next, the outer shape of the blank lens 100" is processed by cutting or by grinding and polishing to generate the desired lens form, completing the production of the finished lens 100' shown, for example, by dashed lines in FIG. 4 (S20). The generation of the lens form is performed on one side at a time, and the lens with only one side finished is called the semi-finished lens.

Next, the finished lens 100' is edged to fit the shape of the eyeglass frame 2, completing the generation of the edged lens 100 shown, for example, in FIG. 6 (S21). Next, the edged lens 100 is mounted in the eyeglass frame 2 with the spring connectors 10 and 20 electrically connected to the liquid crystal lens structure 50, thus completing the production of the electronic eyeglasses 1 (S22).

In the condition of the blank lens 100" (see FIG. 4), the sealing agent 140 with the spacer members 141 mixed therein is formed around the liquid crystal lens structure 50, and the gap created outside the sealing agent 140 between the first and second transparent substrates 110 and 120 is filled with the filling layer 150. Accordingly, the cell gap of the liquid crystal lens structure 50 is maintained at a prescribed thickness. When the finished lens 100' (indicated by dashed lines in FIG. 4) is thereafter generated by grinding and polishing, the cell gap of the liquid crystal lens structure 50 is likewise maintained at the prescribed thickness.

In the production process of the liquid crystal lens, the liquid crystal lens structure 50 is subjected to the greatest pressure when generating the finished lens by grinding; at this time, if the sealing agent 140 with the spacer members 141 mixed therein and the filling layer 150 are sound, the cell gap of the liquid crystal lens structure 50 is maintained at the prescribed thickness. Thereafter, when the edged lens 100 is generated, the outer edges of the filling layer 150 are removed according to the shape of the eyeglass frame 2, but the cell gap of the liquid crystal lens structure 50 can be sufficiently maintained at the prescribed thickness by the remaining filling layer 150 and the sealing agent 140.

In the liquid crystal lens production process illustrated in FIGS. 7 to 10, the sealing agent 140 and the filling layer 150 have been formed by UV radiation, etc., after depositing the photosetting resin 212 and the transparent adhesive material 216 between the first and second transparent substrates 110 and 120. Alternatively, first the sealing agent 140 may be formed by irradiating only the photosetting resin 212 with UV rays, and thereafter, the transparent adhesive material 216 may be filled into the gap between the first and second transparent substrates 110 and 120 by capillary action and irradiated with UV rays to form the filling layer 150. In this case, UV rays are irradiated in two steps, but filling the transparent adhesive material 216 after completing the formation of the sealing agent 140 offers the advantage of improving the efficiency of the job of filling the transparent adhesive material 216, since there is no need to take special care to avoid misalignment after bonding.

In the liquid crystal lens production process illustrated in FIGS. 7 to 10, the sealing agent 140 and the filling layer 150 have been formed by UV radiation, etc., after depositing the photosetting resin 212 and the transparent adhesive material 216 between the first and second transparent substrates 110 and 120. Alternatively, before bonding the first and second transparent substrates 110 and 120 together, the photosetting resin 212 and the transparent adhesive material 216 may be deposited on the first transparent substrate 110, and thereafter, the first and second transparent substrates 110 and 120 may be bonded together. In this case, the transparent adhesive material 216 is also dripped in a prescribed amount from the dispenser (not shown) onto the first transparent substrate 110. After that, the photosetting resin 212 and the transparent adhesive material 216 deposited between the first and second transparent substrates 110 and 120 are simultaneously exposed to UV radiation to form the sealing agent 140 and the filling layer 150, as in the case of FIG. 10(c).

Before filling the transparent adhesive material 216 for forming the filling layer 150, if the regions on the first and second transparent substrates 110 and 120, between which the transparent adhesive material 216 is to be filled, are pretreated by plasma, or if the surfaces of the regions on the first and second transparent substrates 110 and 120, between which the transparent adhesive material 216 is to be filled, are cleaned after dropping the liquid crystal material (see S16), then the wettability of the transparent adhesive material 216 can be improved. Further, if the base surfaces of the regions on the first and second transparent substrates 110 and 120, between which the transparent adhesive material 216 is to be filled, axe roughed to increase the contact area, the adhesion can be enhanced. In the above-described example, the transparent adhesive material 216 has been described as adhering to the alignment films 115 and 125, but if the adhesion to ITO, etc., is strong enough, the alignment films 115 and 125 need not necessarily be formed in the region where the filling layer 150 is formed.

Figure 11:
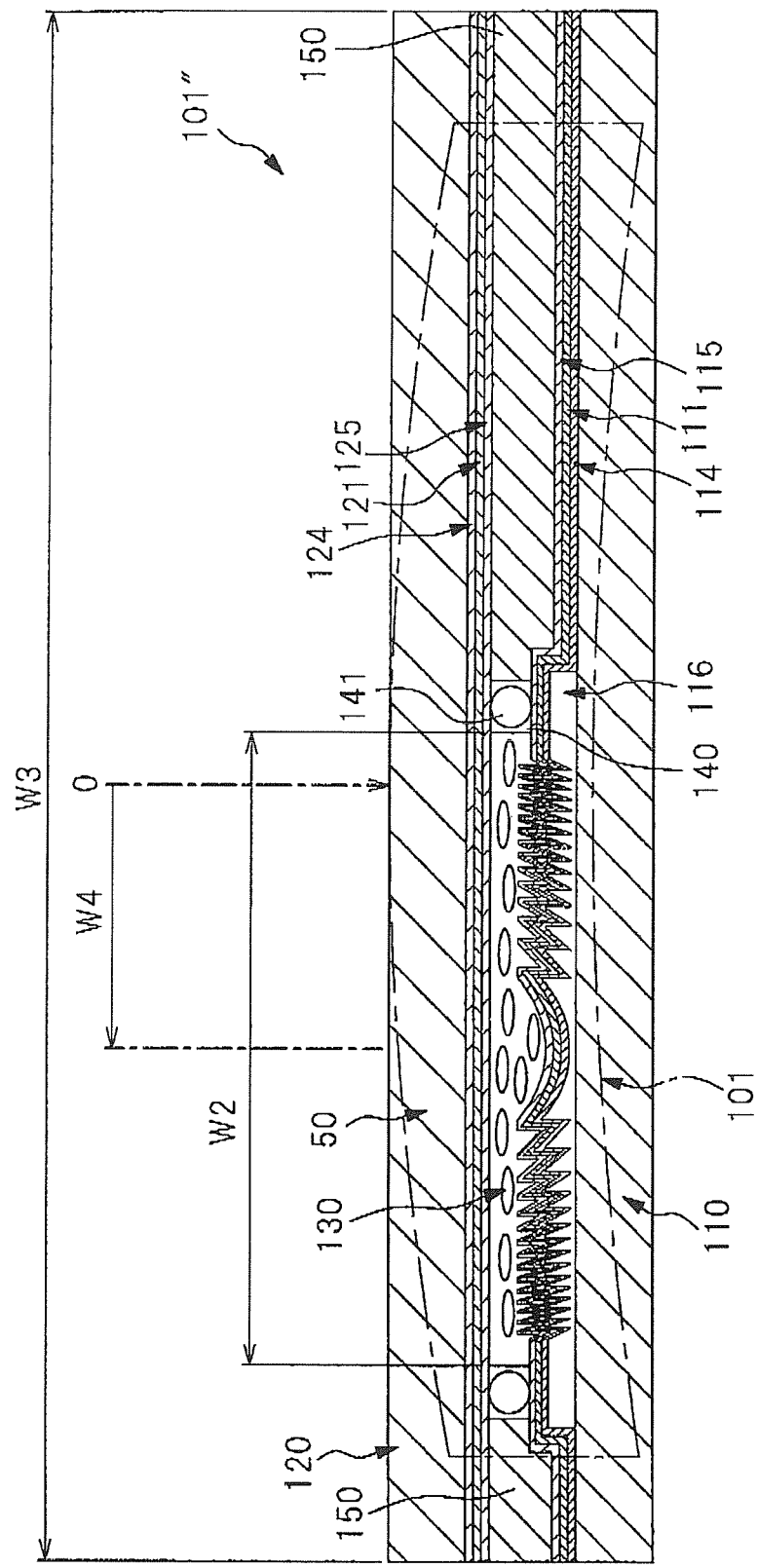
FIG. 11 is a cross-sectional view of an alternative blank lens 101".

FIG. 11 is a cross-sectional view of an alternative blank lens 101".

The only difference between the blank lens 100" shown in FIG. 4 and the alternative blank lens 101" shown in FIG. 11 is that, in the blank lens 101", the liquid crystal lens structure 50 is displaced from the lens center O by a distance w4 to the left in the figure. In FIG. 11, the same component elements as those in FIG. 4 are designated by the same reference numerals.

The blank lens 101" shown in FIG. 11 is advantageous for use in such cases as when it is desired to place the liquid crystal lens structure 50, not in the center of the edged lens 101, but in a position displaced from the center. One such example is the case in which it is desired to place the near-viewing segment of a bifocal lens in a position displaced downward from the center of the eyeglass lens. The example shown in FIG. 11 is only one example, and the distance w4 can be determined as desired. Furthermore, if the width w2 of the liquid crystal lens structure 50 is made smaller relative to the diameter of the blank lens, the margin allowed for edging becomes correspondingly larger, which is advantageous.

Accordingly, even when the liquid crystal lens structure is located in the center of the blank lens, the edged lens can be generated by displacing the center of the edged lens from the center of the blank lens so that, when edged, the liquid crystal lens structure is located in the desired position within the edged lens. Alternatively, the liquid crystal lens structure may be initially formed in the desired position within the blank lens so that, when edged, the liquid crystal lens structure is automatically located in a position displaced from the center of the edged lens.

Figure 12:
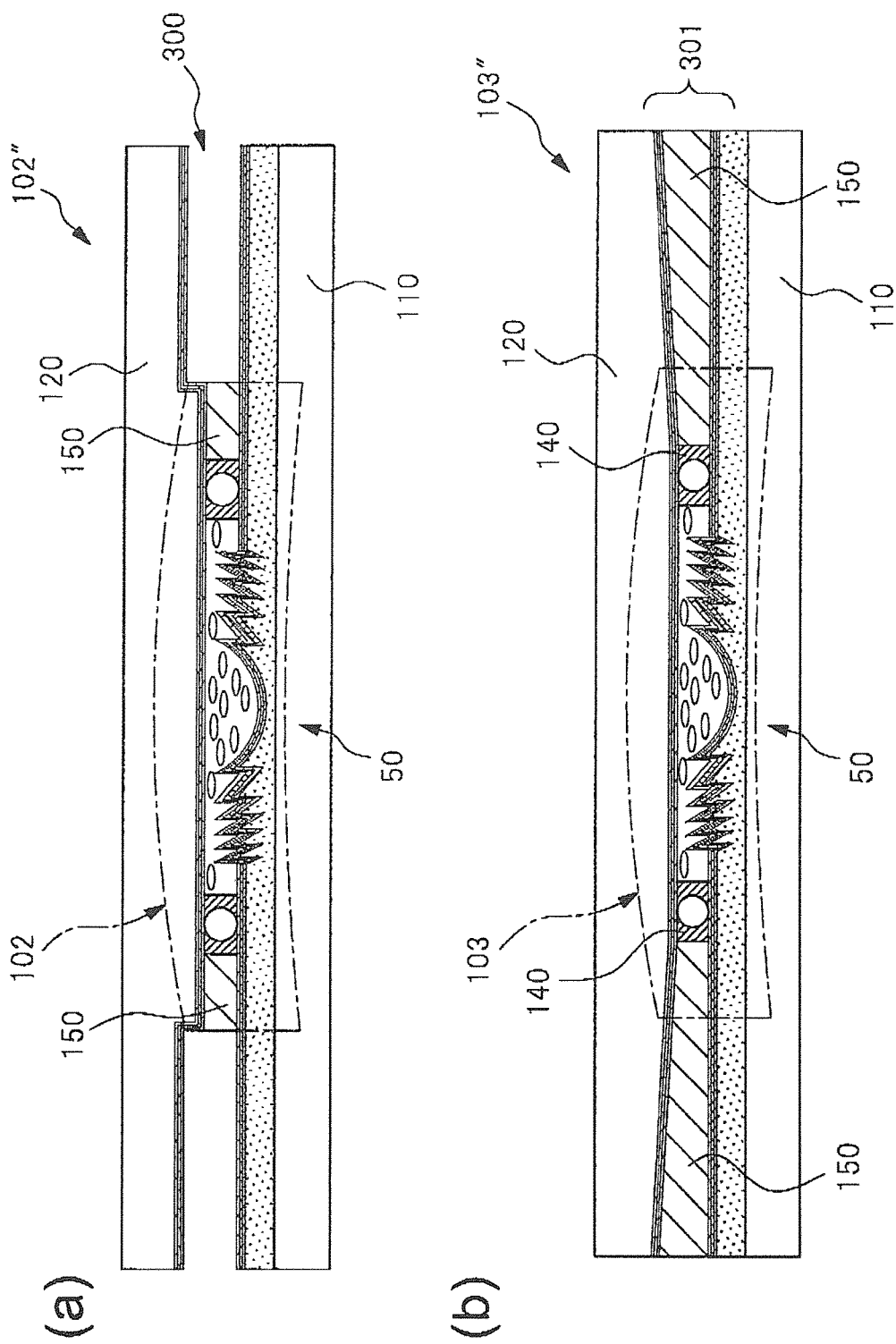
FIG. 12 is a cross-sectional view of another alternative blank lens.

FIG. 12 is a cross-sectional view of another alternative blank lens.

FIG. 12(*a*) shows an example in which the spacing provided between the substrates around the periphery of the blank lens 102" is enlarged so that the transparent adhesive material can be filled easily. In this case also, the filling layer 150 can be formed by avoiding the portions where the openings 300 for connecting the spring connectors 10 and 20 are formed. The gap and the wettability due to the surface tension between materials have much to do with capillary action; generally, if the gap is large, it is difficult to fill the gap. In FIG. 12(*a*), the edged lens 102 generated by edging from the blank lens 102" is indicated by semi-dashed lines. Further, in the blank lens 102" shown in FIG. 12(*a*), the Fresnel lens structure in the liquid crystal lens structure 50 is formed in a single layer over the entire surface of the first transparent substrate 110.

In the blank lens 100" shown in FIG. 4, the gap created between the first and second transparent substrates 110 and 120 to accommodate the filling layer 150 is substantially constant in width along the length thereof. By contrast, in the blank lens 102", 103" shown in FIG. 12(*a*), the gap 300, 301 created between the first and second transparent substrates 110 and 120 to accommodate the filling layer 150 becomes larger toward the periphery of the blank lens 102", 103" and becomes smaller toward the sealing agent 140. The gap and the wettability due to the surface tension between materials have much to do with capillary action; generally, as the gap becomes smaller, it becomes easier to fill the gap. Accordingly, when the gap 301 created between the first and second transparent substrates 110 and 120 to accommodate the filling layer 150 is formed as described above, it becomes easier for the transparent adhesive material 216 to be filled into the gap by capillary action, and in particular, it becomes easier to prevent bubbles, etc., from entering the region of the edged lens 103. In FIG. 12(*b*), the edged lens 103 generated by edging from the blank lens 103" is indicated by semi-dashed lines. Further, in the blank lens 103" shown in FIG. 12(*b*), the Fresnel lens structure in the liquid crystal lens structure 50 is formed in a single layer over the entire surface of the first transparent substrate 110.

Figure 13:
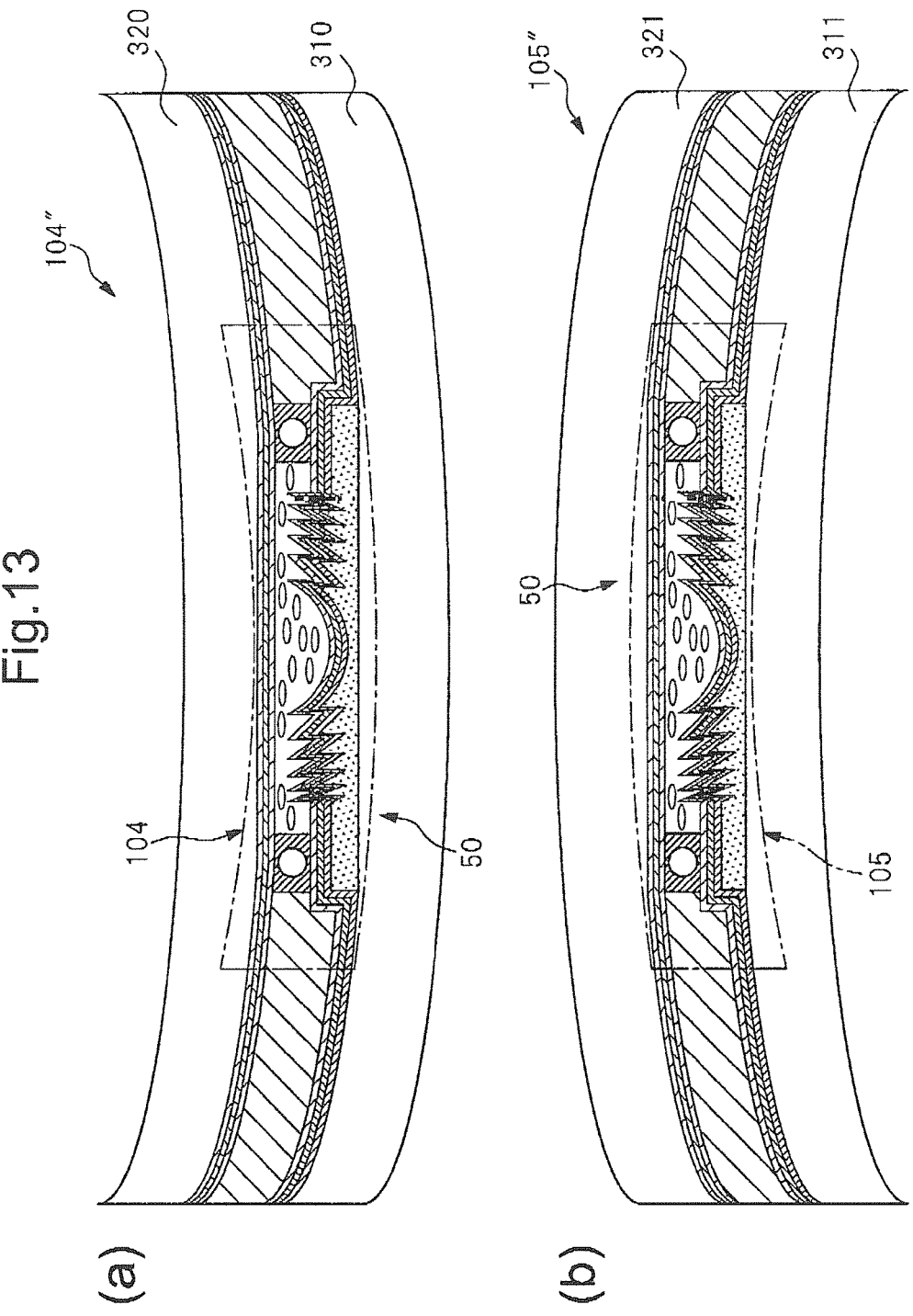
FIG. 13 is a cross-sectional view of still another alternative blank lens.

FIG. 13 is a cross-sectional view of still another alternative blank lens.

In FIG. 13, the two transparent substrates constituting the blank lens are not flat in shape, but are preformed so as to have a curved cross-sectional shape. In this case also, the liquid crystal lens can be fabricated by using the liquid crystal lens production process previously illustrated in FIGS. 7 to 10, the only difference being in the initial shape of the transparent substrates.

In FIG. 13(*a*), the first and second transparent substrates 310 and 320 both have a curved cross-sectional shape convex downward as viewed in the figure. In FIG. 13(*b*), the first and second transparent substrates 311 and 321 both have a curved cross-sectional shape convex upward as viewed in the figure. In FIG. 13(*a*), the edged lens 104 generated by edging from the blank lens 104" is indicated by semi-dashed lines, and in FIG. 13(*b*), the edged lens 105 generated by edging from the blank lens 105's is indicated by semi-dashed lines.

The shapes shown in FIGS. 13(*a*) and 13(*b*) are only examples, and the two transparent substrates may take other curved cross-sectional shapes. Alternatively, a substrate planar in shape, such as the first or second transparent substrate 110 or 120 shown in FIG. 4, may be employed as one of the two transparent substrates, and only the other of the transparent substrates may be formed to have a curved cross-sectional shape.

The above description has been given by dealing with the configuration in which the Fresnel lens structure is constructed only on the first transparent substrate and no Fresnel lens structure on the second transparent substrate, but the configuration is not limited to this specific example; rather, the Fresnel lens structure may be formed on both the first and second transparent substrates. Further, the method of producing the Fresnel lens structure on the transparent substrate is not limited to the imprint method that produces the structure by depositing a resin within the substrate, but the Fresnel lens structure may be formed by directly processing the transparent substrate.

While the first and second transparent substrates have been shown as having the same thickness throughout the figures given herein, it will be appreciated that the two transparent substrates need not necessarily have the same thickness, but use may be made, for example, of a combination of a thin film-'like substrate and a thick substrate, or the two transparent substrates may be formed from different materials.

Figure 15:
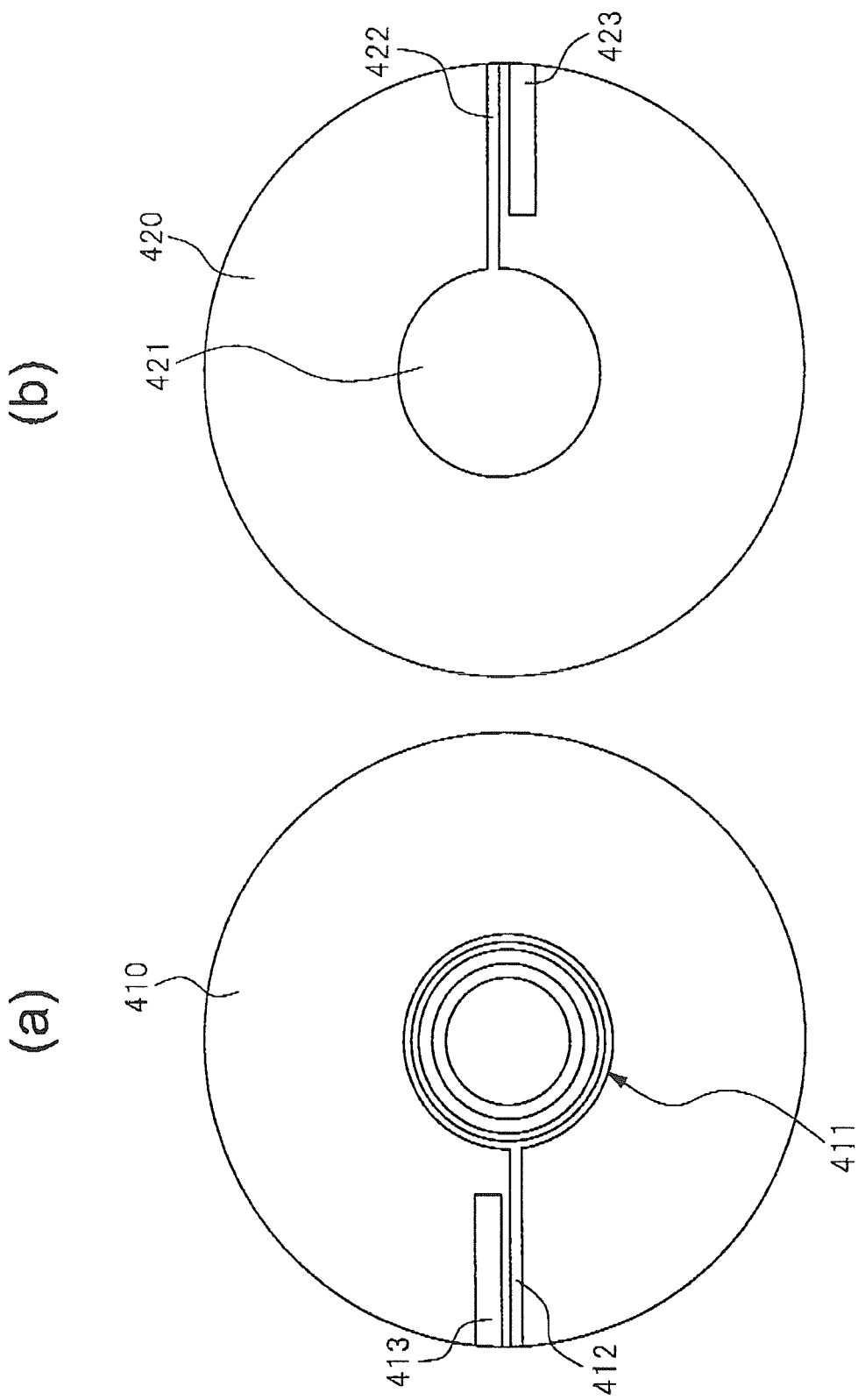
FIG. 15 is a diagram showing two transparent substrates constituting a blank lens 400".

Next, the electrical connections between the spring connectors and the corresponding connecting lines in the edged lens will be described in detail below. FIGS. 14 and 15 are diagrams for explaining an edged lens 400.

The edged lens 400 shown in FIG. 14(*a*) can be mounted. in the eyeglass frame of the electronic eyeglasses 1 in the same manner as the edged lens 100 shown in FIG. 1. FIG. 14(*a*) is a plan view of a pre-edging lens 400' from which the edged lens 400 to be mounted to the electronic eyeglasses 1 of FIG. 1 is generated by edging its outer shape along dashed line G to fit the eyeglass frame 2 of the electronic eyeglasses 1, and FIG. 14(*b*) is a side view of the pre-edging lens 400'.

FIG. 15(*a*) is a diagram showing a first transparent substrate 410, and FIG. 15(*b*) is a diagram showing a second transparent substrate 420. The first and second transparent substrates 410 and 40 are cylindrically shaped substrates. The first and second transparent substrates 410 and 420 are bonded together so as to seal, therein a sealing agent 431, liquid crystal layer 430, etc., and then ground and polished so that the outer shape has a desired lens shape (for example, a concave lens), thus producing the pre-edging lens 400' as shown in FIG. 14(a). The details of the production method will be described later with reference to FIG. 19.

As shown in FIG. 15(a), a first recessed portion 413 is formed in the first transparent substrate 410 on the side thereof to be connected to the second transparent substrate 420. A first transparent electrode 411 formed by sputtering ITO (indium tin oxide) and a first connecting line 412 connected to the first transparent electrode 411 are located on a Fresnel lens structure 416 formed on the first transparent substrate 410.

As shown in FIG. 15(b), a second recessed portion 423 is formed in the second transparent substrate 420 on the side thereof to be connected to the first transparent substrate 410. Further, a second connecting line 422 is formed in the position opposite the first recessed portion 413, while the second recessed portion 423 is formed in the position opposite the first connecting line 412. A second transparent electrode 421 formed by sputtering ITO, as well as the second connecting line 422 connected to the second transparent electrode 421, is located on the second transparent substrate 420.

Since the first and second transparent substrates 410 and 420 formed with the respective recessed portions, before forming the transparent conductive films, etc., are identical in shape, the step of depositing the films on the respective substrates is also identical, and hence the production of the finished lens 400' can be accomplished easily and at relatively low cost.

As shown in FIG. 14(b), the first spring connector 10 attached to the eyeglass frame 2 is inserted into the second recessed portion 423 through the edge face of the edged lens 400 and brought into contact with the first connecting line 412 located inside the second recessed portion 423. Since the side face of the forward end 11 of the first spring connector 10 is pressed onto the first connecting line 412 located inside the second recessed portion 423 by the spring force exerted by the spring built into the first spring connector 10, the electrical conduction between the first spring connector 10 and the first connecting line 412 is ensured (see FIG. 18(a)).

Likewise, as shown in FIG. 14(b), the second spring connector 20 attached to the eyeglass frame 2 is inserted into the first recessed portion 413 through the edge face of the edged lens 400 and brought into contact with the second connecting line 422 located inside the first recessed portion 413. Since the side face of the forward end 21 of the second spring connector 20 is pressed onto the second connecting line 422 located inside the first recessed portion 413 by the spring force exerted by the spring built into the second spring connector 20, the electrical conduction between the second spring connector 20 and the second connecting line 422 is ensured (see FIG. 18(a)).

While the first and second recessed portions 413 and 423 have each been formed in a rectangular shape of length w5, it will be appreciated that the shape and length of the first and second recessed portions 413 and 423 are not limited to any specific shape or length, but each recessed portion may be formed, for example, in a circular or elliptical shape or in a triangular or other polygonal shape. Further, the width of each recessed portion may be suitably chosen according to the diameter, etc., of the spring connector to be inserted therein.

Figure 16:
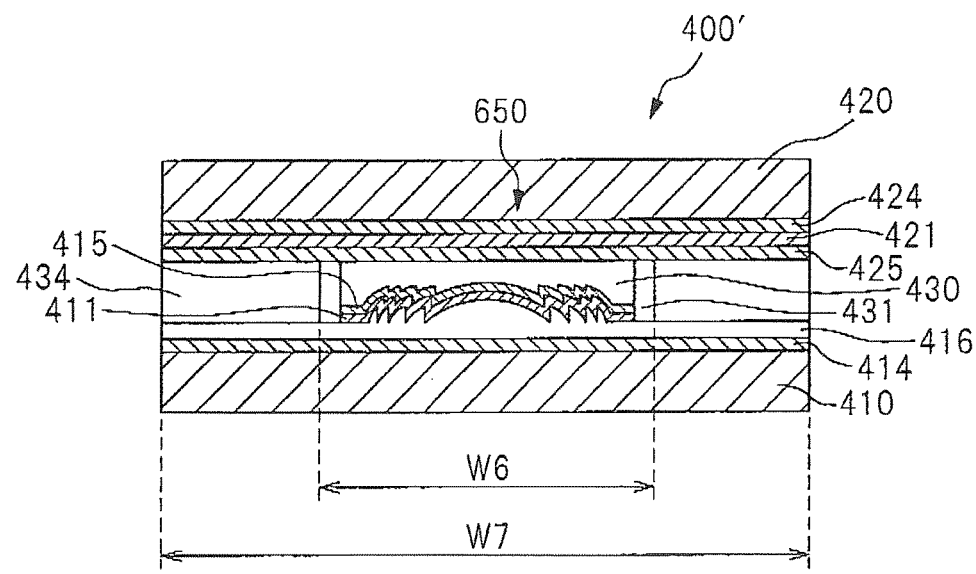
FIG. 16 is a cross-sectional view taken along line FF' in FIG. 14(a)

FIG. 16 is a cross-sectional view taken along line FF' in FIG. 14(a).

As shown in FIG. 16, the finished lens 400' comprises the first transparent substrate 410, the second transparent substrate 420, and the liquid crystal layer 430 sandwiched between the first and second transparent substrates 410 and 420 and sealed by the sealing agent 431. The liquid crystal layer 430 is formed using a homogeneously aligned liquid crystal, but use may be made of a vertically aligned liquid crystal or a twisted nematic liquid crystal.

On the first transparent substrate 410, there are formed one on top of another a first gas barrier layer 414 ($SiO_2$, thickness 200 nm) for preventing gases generated from the transparent substrate from infiltrating into the liquid crystal layer 430, the Fresnel lens structure 416, the first transparent electrode 411 (ITO, thickness 50 nm) overlying the Fresnel lens structure 416, and a first alignment film 415 (thickness 50 nm) overlying the first transparent electrode 411. The first gas barrier layer 414 here may be formed so as to overlie the Fresnel lens structure 416.

On the second transparent substrate 420, there are formed one on top of another a second gas barrier layer 424 ($SiO_2$, thickness 200 nm) for preventing gases generated from the transparent substrate from infiltrating into the liquid crystal layer 430, the second transparent electrode 421 (ITO, thickness 50 nm) as a planar transparent electrode disposed opposite the first transparent electrode 411, and a second alignment film 425 (thickness 50 nm) overlying the second transparent electrode 421.

The sealing agent 431 contains a plurality of spacers (diameter 10.5 µm) foamed from a resin or silica (not shown) in order to maintain the spacing between the first and second transparent electrodes 411 and 421 constant. A transparent resin 434 is filled into the space around the periphery of the sealing agent 431.

The first and second transparent substrates 410 and 420 are each formed from a cylindrically shaped polycarbonate material of thickness 5 mm, but the thickness is not limited to this particular value; further, a glass substrate may be used instead. The Fresnel lens structure 416 is formed using an acrylic material, but use may be made of other optical material such as a cyclic olefin-based transparent resin, a radically polymerized acrylic-based US-curable resin, a cationic polymerized epoxy-based US-curable resin, a thermosetting resin, or an inorganic/organic hybrid material.

In the figure, w6 indicates the region where the liquid crystal lens structure 650 is formed, and in the example of FIGS. 16, w6=20 mm; on the other hand, w7 indicates the outer dimension of the blank lens 400" (i.e., the finished lens 400'), and in the example of FIG. 16, w7=75 mm. However, these values are only examples, and other suitable values may be employed.

In FIG. 16, it should be noted that, for convenience of explanation, the thickness of each substrate and the relative thicknesses of the layers are not drawn to scale, and therefore that the finished lens 400' is not shown as having a prescribed lens form as shown in FIG. 14(b). Further, the substrate thickness value and the layer thickness values given above are only examples and are not limited to the above values.

Figure 17:
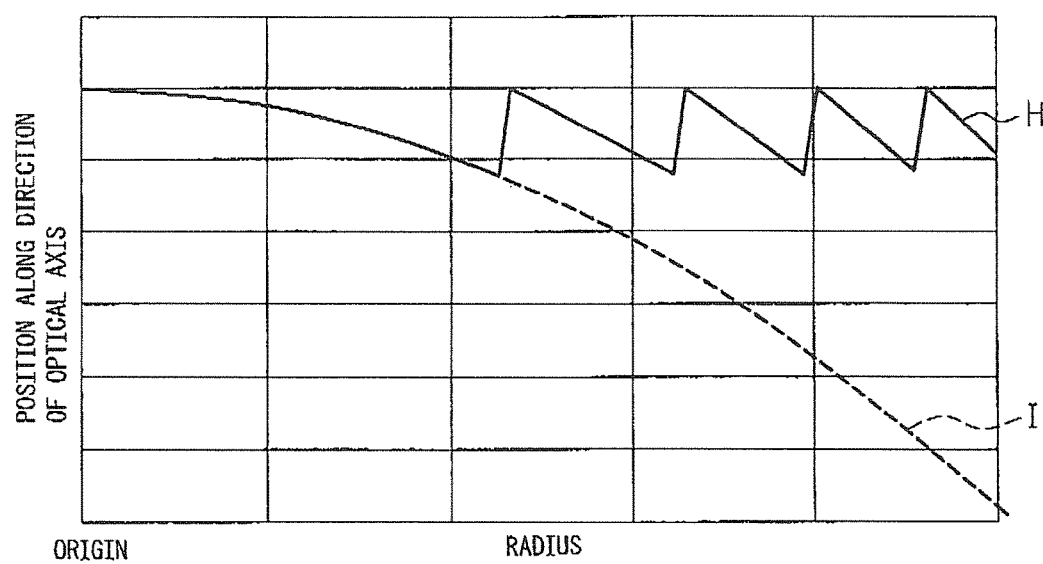
FIG. 17 is a diagram for explaining the structure of a Fresnel lens surface generated by a liquid crystal lens structure.

FIG. 17 is a diagram for explaining the structure of the Fresnel lens surface generated by the liquid crystal lens structure.

FIG. 17 shows a cross section of the Fresnel lens surface taken along the radial direction with the vertex of the Fresnel lens surface (i.e., the point on the lens surface that lies on the optical axis) as the origin. In the figure, the abscissa represents the position taken in the radial direction, and the ordinate represents the position taken in the direction of the optical axis.

Dashed line I in FIG. 17 indicates the lens surface that defines the original lens characteristics of the liquid crystal lens structure. The lens surface is designed as a continuous curved surface symmetrical about the optical axis, as in the conventional lens. Then, by providing steps on the lens surface so that the position on the lens surface, taken in the direction of the optical axis, coincides with the position of the vertex, the cross-sectional shape H of the Fresnel structure 650 shown in FIG. 17 is generated (each slanted face of the Fresnel structure 650 is shown as a straight line in the figure for convenience of illustration, but actually it is curved like the dashed line I). This results in the generation of the Fresnel lens surface having a plurality of zones divided by steps. In FIG. 16, the Fresnel lens structure 650 is shown as having four zones, but the number of zones shown here is only one example, and is not limited to four.

In the case of the above-described pre-edging lens 400', if the edged lens 400 is generated by cutting the lens at any position along the width w5 of the first and second recessed portions 413 and 423 shown in FIG. 14(*a*), the spring connectors can be connected by inserting them through the edge face of the edged lens 400 (see FIG. 18(*a*)). Accordingly, the outer shape of the edged lens 400 need not be determined in advance as in the prior art, but the edged lens 400 can be generated to fit the frame of any given shape. Further, before edging, the transparent resin 434 is filled into the gap created between the first and second transparent substrates 410 and 420 outside the periphery of the sealing agent 431; here, since the transparent resin 434 is filled into the gap between the substrates by capillary action, if the recessed portions are formed in advance in the substrates, the transparent resin 434 does not intrude into the entire region of the recessed portions. As a result, regardless of the outer shape of the edged lens 400 generated by edging, the connecting lines are always exposed in the corresponding recessed portions so that the spring connectors can be connected electrically to the respective connecting lines.

FIG. 18 is a diagram illustrating how the spring connectors are connected to the edged lens 400.

FIG. 18(*a*) is an enlarged view showing the portion enclosed by dashed line M of the edged lens 400 shown in FIGS. 14 to 17. As previously described, since the side face of the forward end 11 of the first spring connector 10 is pressed onto the first connecting line 412 located inside the second recessed portion 423 by the spring force exerted by the spring built into the first spring connector 10, the electrical conduction between the first spring connector 10 and the first connecting line 412 is ensured. Similarly, since the side face of the forward end 21 of the second spring connector 20 is pressed onto the second connecting line 422 located inside the first recessed portion 413 by the spring force exerted by the spring built into the second spring connector 20, the electrical conduction between the second spring connector 20 and the second connecting line 422 is ensured.

FIG. 18(*b*) shows a modified example of the connecting structure shown in FIG. 18(*a*). In the example of FIG. 18(*b*), the inside of the first recessed portion 413 is filled with a transparent resin 65. The first recessed portion 413 is filled with the transparent resin 65 right up to the position as far as which the forward end of the inserted second spring connector 20 reaches. Likewise, the inside of the second recessed portion 423 is filled with a transparent resin 66 right up to the position as far as which the forward end 11 of the inserted first spring connector 10 reaches. If any empty space is left in the recessed portion, an air layer may be generated, and the boundary between the portion containing the air layer and the other portion (the resin-filled portion) may become clearly visible, producing an undesirable appearance when the lens is viewed from the outside. In view of this, after edging the electronic eyeglass lens, the inside of the first recessed portion 413 and the inside of the second recessed portion 423 are filled with the transparent resins from the edges of the respective substrates to eliminate such deficiency.

FIG. 18(*c*) shows another modified example of the connecting structure shown in FIG. 18(*a*). In the example of FIG. 18(*b*), the inside of the first recessed portion 413 and the inside of the second recessed portion 423 have been filled with the transparent resins 65 and 66, respectively, while leaving in each recessed portion a space into which the forward end of the corresponding spring connector is to be inserted. By contrast, in the example of FIG. 18(*c*), after the forward end of the spring connector has been inserted into the space as shown in FIG. 18(*b*), a conductive material 67 is filled into the space so as to completely seal the interior space of the first recessed portion 413. Similarly, conductive material 68 is filled so as to completely seal the interior space of the second recessed portion 423. The conductive material 68 is made to contact the forward end 11 of the first spring connector 10, while the conductive material 67 is made to contact the forward end 21 of the second spring connector 20. The conductive materials 67 and 68 are made, for example, of a metal, conductive paste, transparent conductive ink, or the like. The provision of the conductive materials 67 and 68 serves to further ensure the electrical conduction between the connecting lines and the spring connectors. If the conductive material is opaque, it is preferable to place the conductive material in the outermost portion of the edged lens 400 so that it is hidden behind the eyeglass frame 2, if at all possible.

FIG. 18(*d*) shows still another modified example of the connecting structure shown in FIG. 18(*a*). The difference between the example of FIG. 18(*c*) and the example of FIG. 18(*d*) is that, in the example of FIG. 18(*d*), a first connecting portion 483 and a second connecting portion 484 that contact the respective conductive materials 68 and 67 shown in FIG. 18(*c*) are formed on the edge face of the edged lens 400. The first and second connecting portions 483 and 484 are formed across the entire width of the edged lens 400. In the example of FIG. 18(*d*), the other portions are the same as those shown in FIG. 18(*c*). By thus forming the first and second connecting portions 483 and 484 across the entire width, it becomes possible to provide greater freedom in the arrangement of the two spring connectors. The width of the first and second connecting portions 483 and 484 is not limited to the illustrated example.

In the examples of FIGS. 18(*b*) to 18(*d*), no air layers are generated because the first and second recessed portions 413 and 423 are almost filled up with the transparent resins and/or conductive materials. The examples of FIGS. 18(*b*) to 18(*d*) thus eliminate the problem that may arise due to the generation of an air layer. Further, in the examples of FIGS. 18(*c*) and 18(*d*), since the area that contacts the forward end of each spring connector can be made larger by the respective conductive materials 67 and 68, it is advantageous to minimize the width of the first and second connecting lines 412 and 422 in order to make them less visible.

Figure 7:
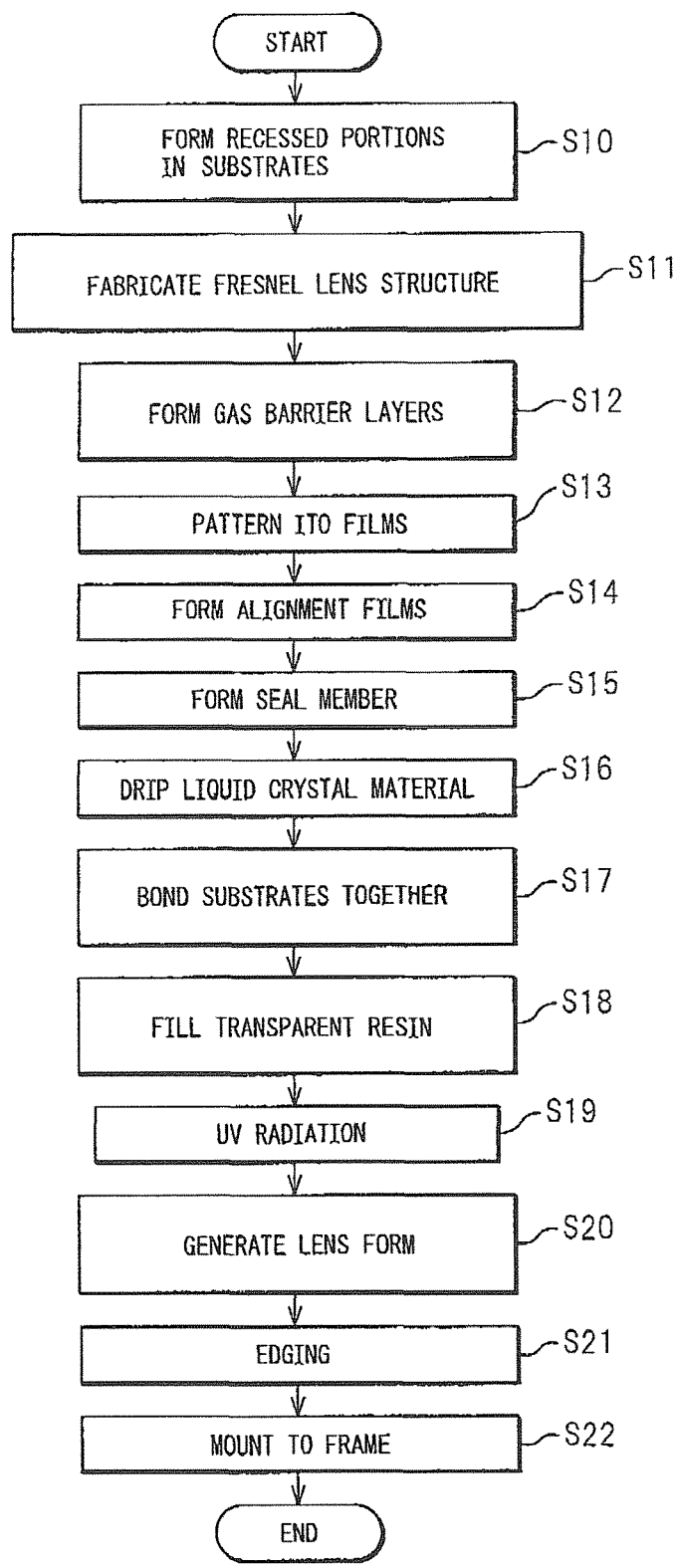
FIG. 7 is a flow diagram showing a liquid crystal lens production process.
Figure 19:
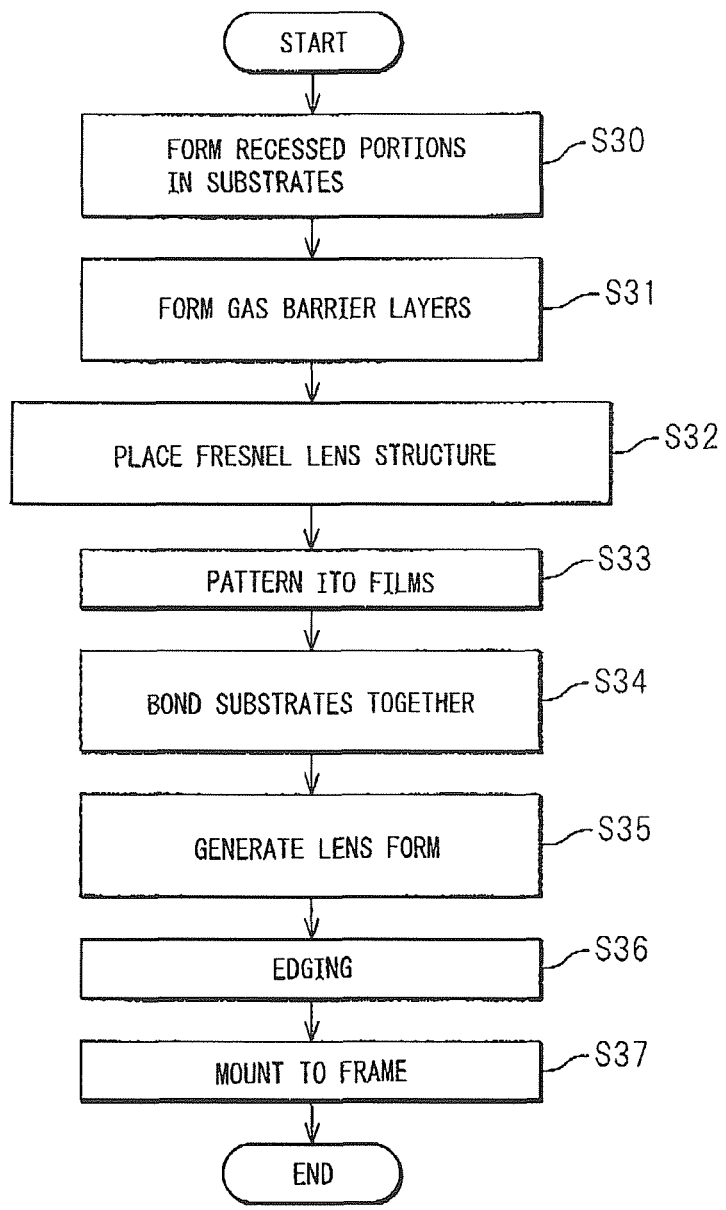
FIG. 19 is a diagram for explaining a production process for the edged lens 400.

The production process previously illustrated in FIG. 7 can be used for the production of the edged lens 400. Instead, an alternative production process to be described hereinafter may be used. FIG. 19 is a diagram for explaining the production process of the edged lens 400. The sequence of process steps for producing the edged lens 400 for use in electronic glasses will be described below with reference to FIG. 19.

First, the first recessed portion 413 is formed in the cylindrically shaped first transparent substrate 410 (thickness 5 mm) by cutting, and the second recessed portion 423 is formed in the cylindrically shaped second transparent substrate 420 (thickness 5 mm) by cutting (S30).

Next, the first gas barrier layer 414 and the second gas barrier layer 424, each of a $SiO_2$ film with a thickness of 200 nm, are formed on the first transparent substrate 410 and the second transparent substrate 420, respectively (S31).

Next, the Fresnel lens structure 416 is placed on the first transparent substrate 410 (S32). The Fresnel lens structure 416 is separately formed by using a UV-curable acrylic resin or the like, and fixedly bonded to the first transparent substrate 410. However, the Fresnel lens structure may be formed by cutting the first transparent substrate, as in the case of the first recessed portion 413, or may be integrally molded with the transparent substrate by casting or injection molding.

Next, an ITO film is deposited over the first transparent substrate 410 on which the Fresnel lens structure 416 has been placed, and the deposited ITO film is patterned to form the first transparent electrode 411 and the first connecting line 412. Similarly, an ITO film is deposited over the second transparent substrate 420, and the deposited ITO film is patterned to form the second transparent electrode 421 and the second connecting line 422 (S33).

Next, the first alignment film 415 is formed on the first transparent electrode 411 of the first transparent substrate 410 and, after rubbing, the sealing agent 431 is formed. Similarly, the second alignment film 425 is formed on the second transparent electrode 421 of the second transparent substrate 420, and rubbing is performed. After that, the liquid crystal material for forming the liquid crystal layer 430 is dripped into the inside space enclosed by the sealing agent 431; then, the first and second transparent substrates 410 and 420 are bonded together in a vacuum atmosphere, and the transparent resin 434 is filled into the space outside the sealing agent 431 (the space where the liquid crystal layer is not formed) by capillary action, to complete the production of the blank lens 400" (S34).

Next, the outer shape of the blank lens is ground and polished to generate the desired lens form, completing the production of the finished lens 400' (S35).

Next, the finished lens 400' is edged to fit the shape of the eyeglass frame 2, completing the generation of the edged lens 400 (S36), and the edged lens 400 is mounted in the eyeglass frame 2 with the spring connectors 10 and 20 electrically connected to the liquid crystal lens structure 650, thus completing the production of the electronic eyeglasses 1 (S37). If necessary, after edging (S36), the transparent resins 65 and 66 and the conductive materials 67 and 68 are filled into the first and second recessed portions 413 and 423, and further, the first and second connecting portions 483 and 484 are formed, as previously illustrated in FIGS. 18(*b*) to 18(*d*).

One of the reasons for forming the recessed portions (or the opening to be described later) in the prevent invention is that, when the first and second transparent substrates 410 and 420 are bonded together in a vacuum atmosphere, and the resin is filled into the space surrounding the sealing agent, the connecting lines are also buried under the resin, making it difficult to achieve electrical connections through the edge face of the electronic eyeglass lens. The present invention addresses such deficiency by forming the recessed portions (or the opening to be described later) for accommodating the respective connecting lines, and thereby providing space, etc., for making electrical connections through the edge face of the electronic eyeglass lens.

Figure 20:
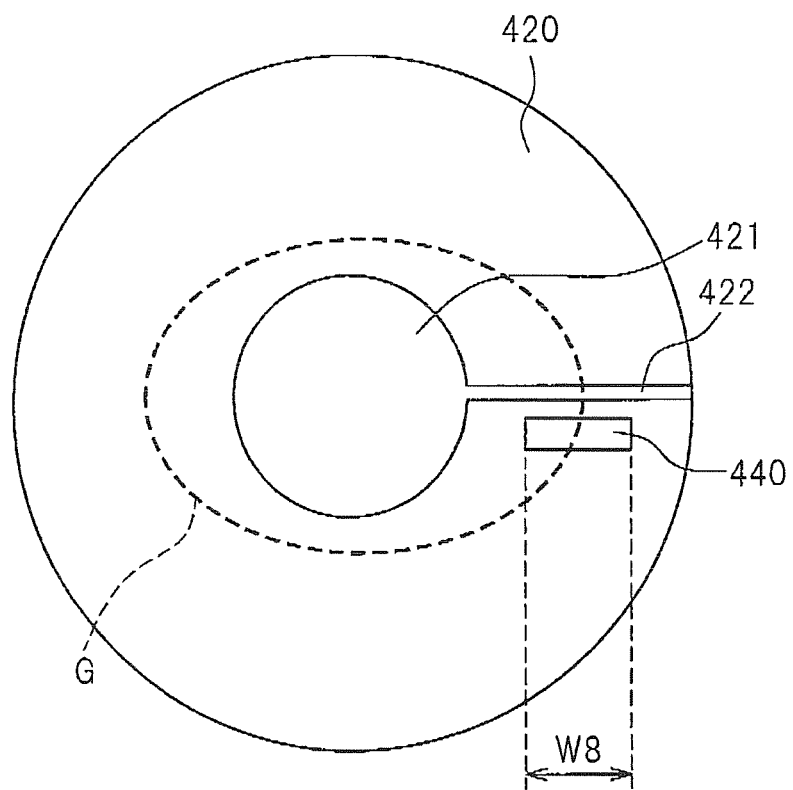
FIG. 20 is a diagram showing a modified example of the finished lens 400'.

FIG. 20 is a diagram showing a modified example of the finished lens 400'.

In the example shown in FIGS. 14 and 15, the first and second recessed portions 413 and 423 have both been formed across the entire "width w5" extending up to the outer periphery of the first and second transparent substrates 410 and 420. By contrast, in the example shown in FIG. 20, the second recessed portion 440 has a width w8 (<w5) and does not reach the outer periphery of the second transparent substrate 420. Though not shown, the first recessed portion formed in the first transparent substrate 410 corresponding to the second transparent substrate 420 shown FIG. 20 also has the same width w8. In the case of FIG. 20 also, the eyeglass lens edged along dashed line G is the same in configuration as the edged lens 400 described above.

Figure 21:
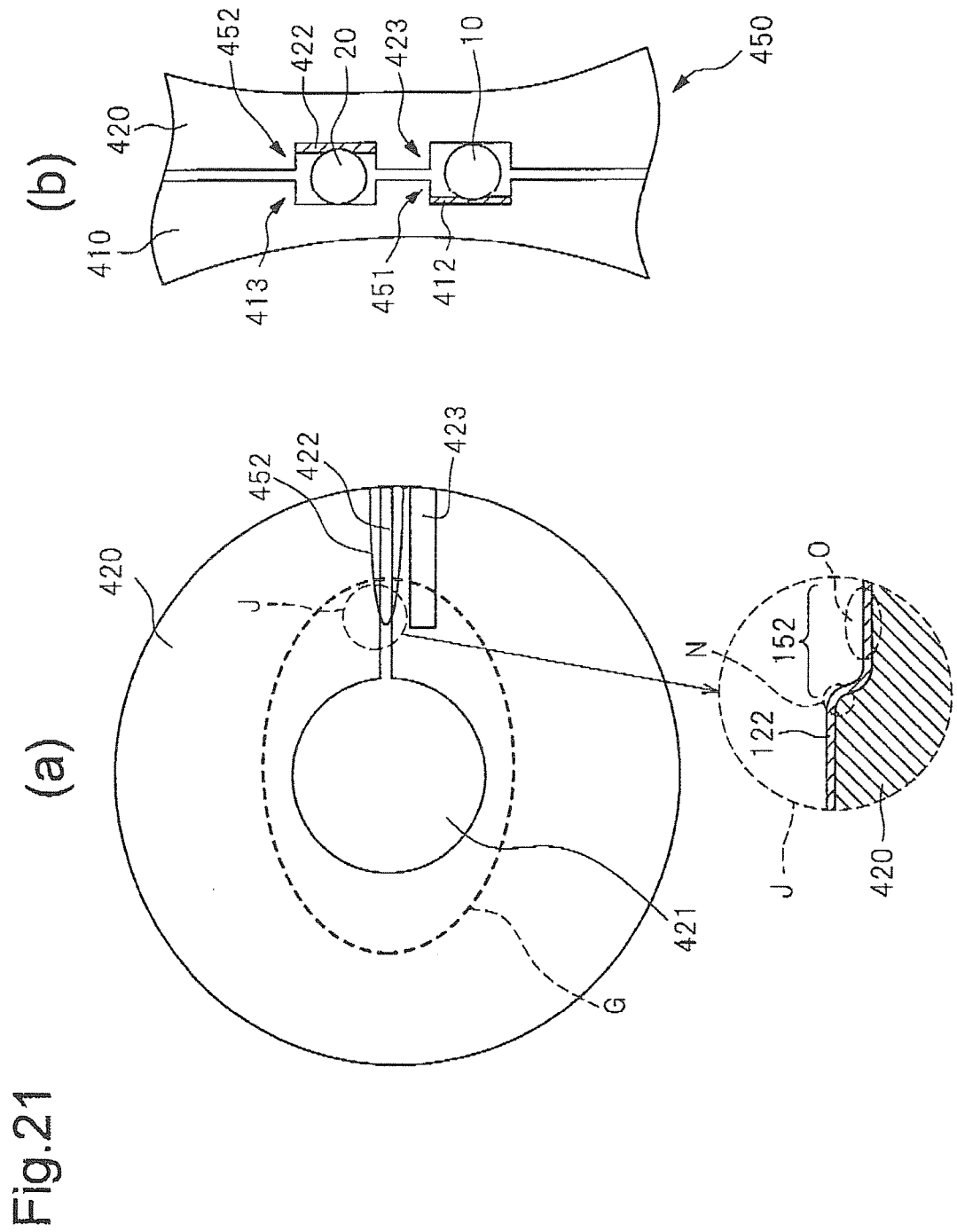
FIG. 21 is a diagram showing another modified example of the finished lens 400'.

FIG. 21 is a diagram showing another modified example of the finished lens 400'.

FIG. 21(*a*) is a plan view showing the second transparent substrate forming the modified example of the finished lens 400', and FIG. 21(*b*) is an enlarged view showing an edge face of a liquid crystal lens 450 produced by edging the electronic lens 100'.

In the second transparent substrate 420 shown in FIG. 21(*a*), a recessed portion 452 is formed in the portion where the second connecting line 422 is to be formed. The second connecting line 422 is formed by sputtering ITO; here, despite the presence of the three-dimensional shape of the recessed portion 452, the ITO film can be formed because of the diffraction of ITO particles. An enlarged cross-sectional view of a portion encircled by dashed line J is also shown in FIG. 21(*a*). As shown in the enlarged cross section J, the forward end of the recessed portion 452 is not formed at an acute angle but is rounded to prevent the second connecting line 422 from breaking at the recessed portion 452. Though not shown here, in the first transparent substrate 410 corresponding to the second transparent substrate 420 shown FIG. 21, a recessed portion 451 is likewise formed in the portion where the first connecting line 412 is to be formed, and the forward end of the recessed portion 451 also is not formed at an acute angle but is rounded.

As shown in FIG. 21(*b*), when the first and second transparent substrates 410 and 420 are bonded together by interposing the sealing agent, etc. therebetween, the recessed portion 452 is located opposite the first recessed portion 413, while the recessed portion 451 is located opposite the second recessed portion 423. In this condition, the first spring connector 10 is inserted into the space created between the second recessed portion 423 and the recessed portion 451, while the second spring connector 20 is inserted into the space created between the first recessed portion 413 and the recessed portion 452. Here, if the depth of the first recessed portion 413 and the recessed portion 452 and the depth of the second recessed portion 423 and the recessed portion 451 are suitably adjusted, the position where the second spring connector 20 is inserted can be placed directly above the position where the first spring connector 10 is inserted. This offers the advantage that the positions of the first and second spring connectors 10 and 20 formed in the eyeglass frame 2 need not be displaced relative to each other in the vertical direction as shown in FIG. 1(*b*).

In the enlarged cross section J shown in FIG. 21(*a*), the forward end of the spring connector may be made to contact the first connecting line 412 at the rounded end of the recessed portion 412 (indicated at "N") or to contact the flat portion of the first connecting line 452 (indicated at "O").

Figure 22:
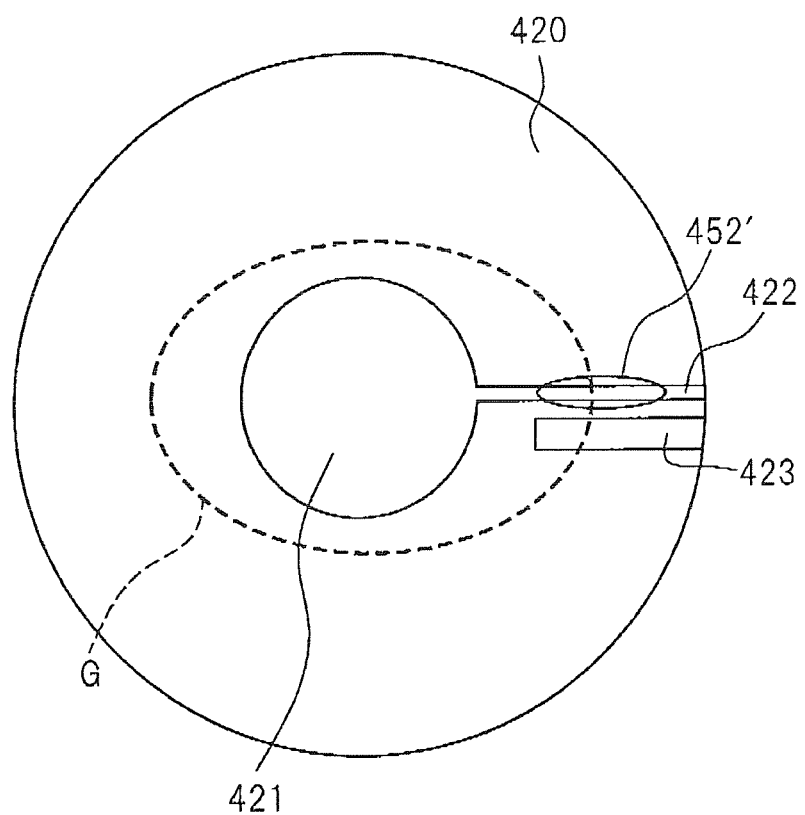
FIG. 22 is a diagram showing a modified example of the finished lens 400'.

FIG. 22 is a diagram showing a modified example of the finished lens 400' shown in FIG. 21.

In FIG. 21, the recessed portions 451 and 452 for holding the first and second connecting lines 412 and 422, respectively, are formed so as to extend up to the periphery of the first and second transparent electrodes 410 and 420. However, as shown in FIG. 22, the recessed portion 452' for holding the second connecting line 422 need not necessarily be extended up to the periphery of the second transparent electrode 420. Though not shown, the same is true for the recessed portion 451' to be formed in the first transparent substrate 410 for holding the first connecting line 412.

Figure 23:
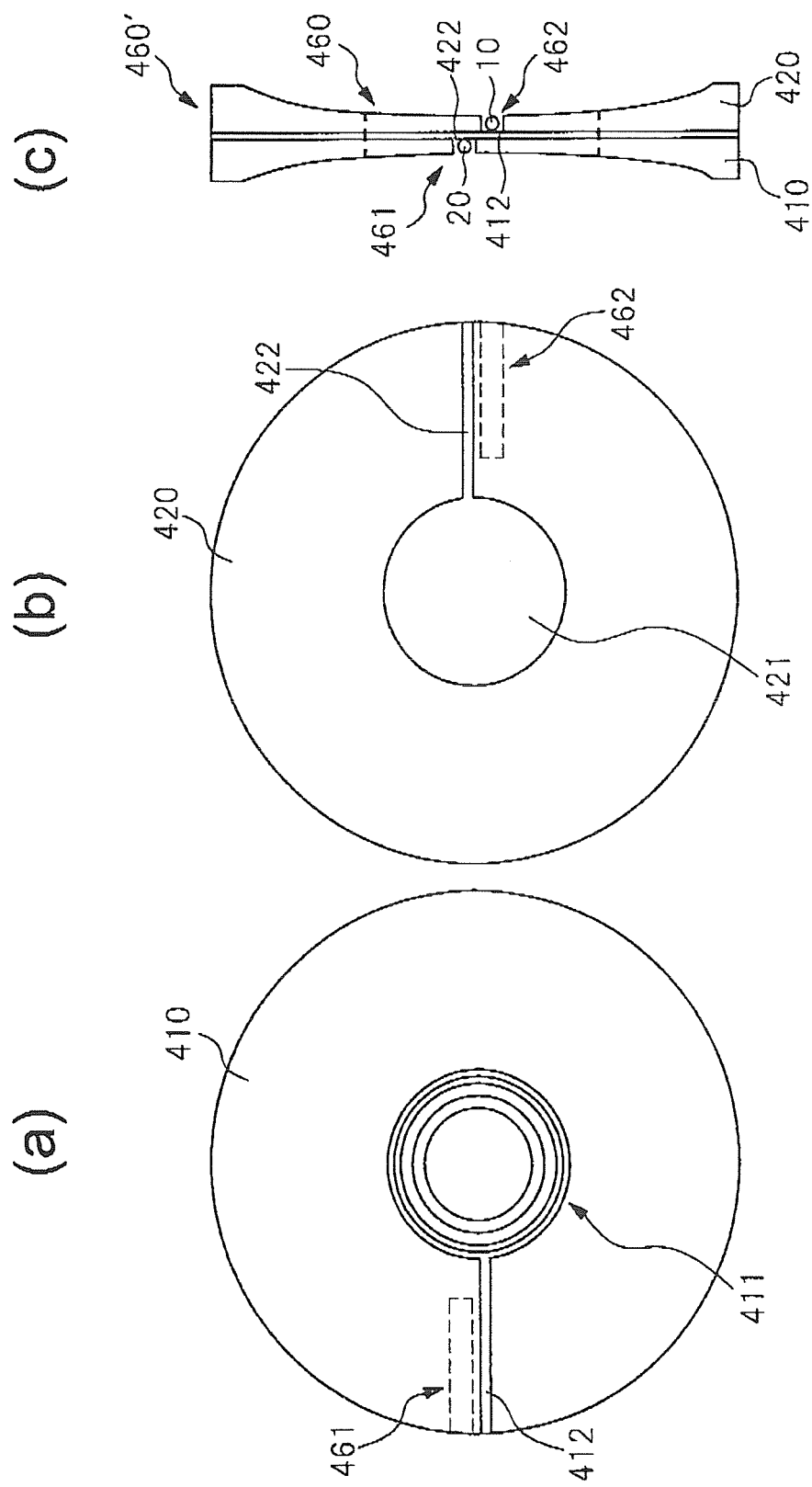
FIG. 23 is a diagram showing a finished lens 460'.

FIG. 23 is a diagram showing a finished lens 460'.

FIG. 23(a) is a plan view showing the first transparent substrate 410 forming the finished lens 460', FIG. 23(b) is a plan view showing the second transparent substrate 420 forming the finished lens 460', and FIG. 23(c) is a side view of the finished lens 460'.

In the finished lens 460' shown in FIG. 23, a first opening 461 is formed in the first transparent substrate 410 instead of the first recessed portion 413 formed in the pre-edging lens 400' and, in the second transparent substrate 420, a second opening 462 is formed instead of the second recessed portion 423.

In the case of the electronic eyeglass lens 460 generated by edging the electronic eyeglass lens 460', electrical conduction between the first and second spring connectors 10 and 20 and the first and second connecting lines 412 and 422 can be achieved, as in the case of the edged lens 400, by providing the first and second openings 461 and 462. The shape of each opening is also not limited to a rectangle, but each may be foamed, for example, in a circular or elliptical shape or in a triangular or other polygonal shape. Further, each opening may be filled with a transparent resin.

FIG. 24(a) is a perspective view of the finished lens 460' shown in FIG. 23, and FIG. 24(b) is a diagram showing a modified example (finished lens 470') of the finished lens 460' shown in FIG. 23.

An opening 471 may be formed in the shape of a hole as shown in FIG. 24(b), rather than forming the opening so as to extend up to the edge of the lens like the opening 461 shown in FIG. 24(a). Though not shown in FIG. 24(b), an opening 472 is also formed in the shape of a hole in the second transparent substrate 420. The shape of each hole also is not limited to a rectangle, but each may be formed, for example, in a circular or elliptical shape or in a triangular or other polygonal shape.

Figure 25:
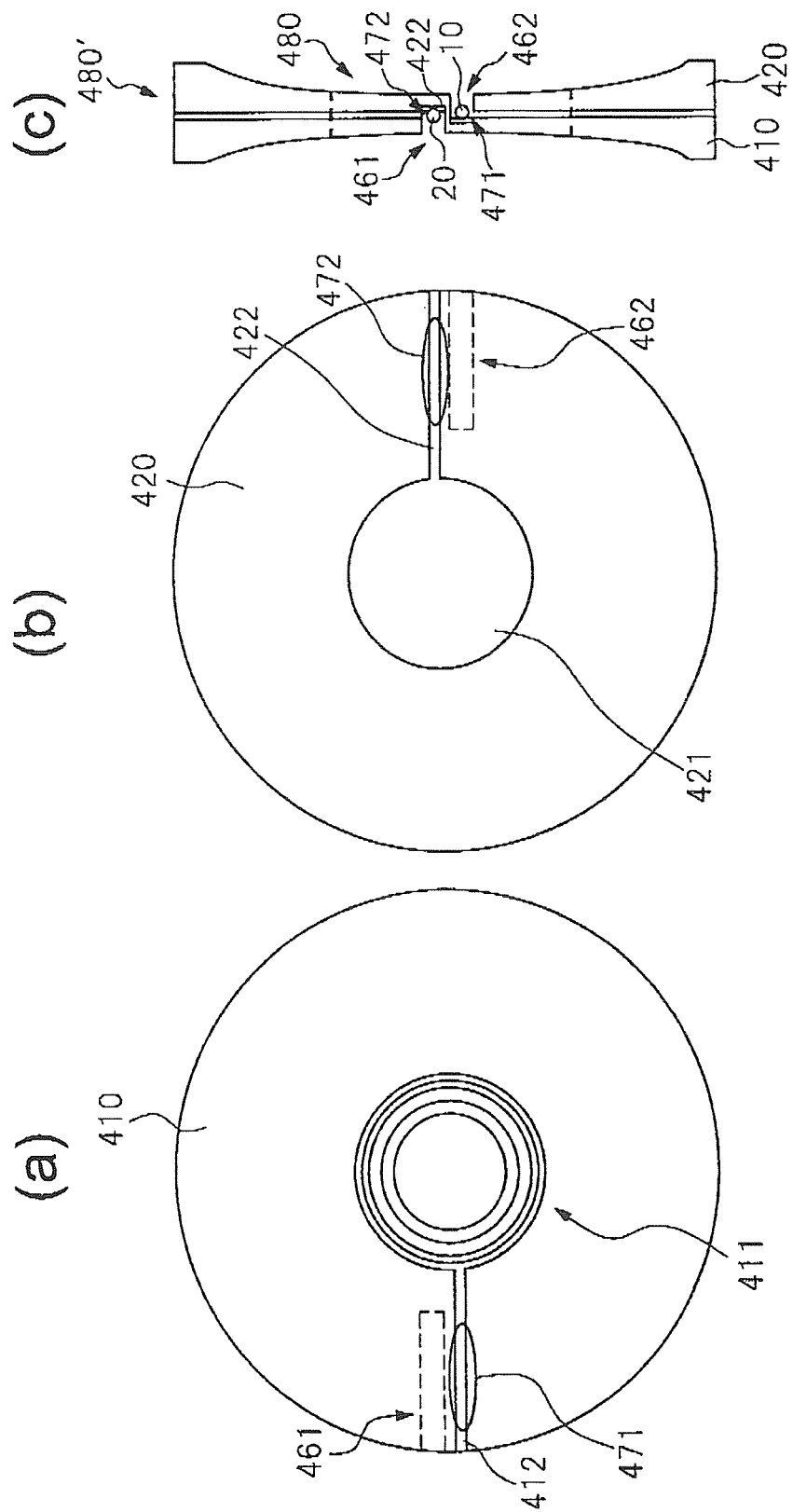
FIG. 25 is a diagram showing a finished lens 480'.

FIG. 25 is a diagram showing a finished lens 480'.

FIG. 25(a) is a plan view showing the first transparent substrate 410 forming the finished lens 480', FIG. 25(b) is a plan view showing the second transparent substrate 420 forming the finished lens 480', and FIG. 25(c) is a side view showing an edge of the finished lens 480'.

In the finished lens 480' shown in FIG. 25, a first opening 461 is formed in the first transparent substrate 410 instead of the first recessed portion 413 formed in the pre-edging lens 400', and in addition, a recessed portion 471 is formed in the portion where the first connecting line 412 is to be formed; likewise, a second opening 462 is formed in the second transparent substrate 420 instead of the second recessed portion 423 formed in the pre-edging lens 400', and in addition, a recessed portion 472 is formed in the portion where the second connecting line 422 is to be formed. The openings and recessed portions are not limited to rectangular in shape, but each may be formed, for example, in a circular or elliptical shape or in a triangular or other polygonal shape; further, the recessed portions may be formed so as to extend up to the outer periphery of the first and second transparent substrates.

As shown in FIG. 25(c), when the first and second transparent substrates 410 and 420 are bonded together by interposing the sealing agent, etc. therebetween, the recessed portion 472 is located opposite the first opening 461, while the recessed portion 471 is located opposite the second opening 462. In this condition, the first spring connector 10 is inserted into the space created between the second opening 462 and the recessed portion 471, while the second spring connector 20 is inserted into the space created between the first opening 461 and the recessed portion 472. If the depths of the recessed portions 471 and 472 are suitably adjusted, the position where the second spring connector 20 is inserted can be placed directly above the position where the first spring connector 10 is inserted. This offers the advantage that the positions of the first and second spring connectors 10 and 20 formed in the eyeglass frame 2 need not be displaced relative to each other in the vertical direction as shown in FIG. 1(b).

FIG. 26 is a diagram showing a finished lens 490'.

FIG. 26(a) is a plan view showing the first transparent substrate 410 forming the finished lens 490', FIG. 26(b) is a plan view showing the second transparent substrate 420 forming the finished lens 490', FIG. 26(c) is a plan view showing the finished lens 490', and FIG. 26(d) is a side view of an edged lens 490

In the first transparent substrate 410, only a first connecting line 491 is formed, as shown in FIG. 26(a), and in the second transparent substrate 420, a second connecting line 492, a third connecting line 493, a first opening 495 foamed in the shape of a hole at one end of the second connecting line 492, and a second opening 496 formed in the shape of a hole at one end of the third connecting line 493 are provided, as shown in FIG. 26(b). Further, as shown in FIG. 26(c), when the first and second transparent substrates 410 and 420 are bonded together by interposing the sealing agent, etc., therebetween, the first connecting line 491 is located opposite the third connecting line 493, and the first and second connecting lines 491 and 493 are electrically connected together by a conductive paste 497.

As shown in FIG. 26(d), when the finished lens 490' is cut along the dashed line G, the first and second openings 495 and 496 are exposed in the edge face of the edged lens 490; in this condition, the second spring connector 20 is brought into contact with the second connecting line 492 through the exposed portion of the first opening 495, and the first spring connector 10 is brought into contact with the third connecting line 493 through the exposed portion of the second opening 496. In the edged lens 490, the position where the second spring connector 20 is inserted can be placed directly above the position where the first spring connector 10 is inserted; this offers the advantage that the positions of the first and second spring connectors 10 and 20 formed in the eyeglass frame 2 need not be displaced relative to each other in the vertical direction as shown in FIG. 1(b). It is advantageous to form the second and third connecting lines 492 and 493 in the first transparent substrate 410 or the second transparent substrate 420, whichever is thicker when edged, because then the contact area with the spring connectors can be made larger.

The hole shape of each opening is not limited to a circle, but each may be formed, for example, in an elliptical shape or in a triangular, rectangular, or other polygonal shape; further, the two openings may be formed as one large opening.

FIG. 27 is a diagram showing a finished lens 500'.

FIG. 27(*a*) is a plan view showing the first transparent substrate 410 forming the finished lens 500', FIG. 27(*b*) is a plan view showing the second transparent substrate 420 forming the finished lens 500', and FIG. 27(*c*) is a plan view showing the finished lens 500'.

As shown in FIG. 27(*a*), in the first transparent substrate 410, the connecting line is formed as a blanket transparent electrode 503 by depositing ITO everywhere except the portion where the first transparent electrode 411 is formed, and a first recessed portion 501 and a second recessed portion 502 having a different length than the first recessed portion are provided as illustrated. In the second transparent substrate 420 also, as shown in FIG. 27(*b*), the connecting line is formed as a blanket transparent electrode 506 by depositing ITO everywhere except the portion where the second transparent electrode 421 is formed, and a third recessed portion 504 and a fourth recessed portion 505 having a different length than the third recessed portion are provided as illustrated. Further, as shown in FIG. 27(*c*), when the first and second transparent substrates 410 and 420 are bonded together by interposing the sealing agent, etc., therebetween, the first recessed portion 501 is located opposite the fourth recessed portion 505, while the second recessed portion 502 is located opposite the third recessed portion 504.

As shown in FIG. 27(*c*), when the edged lens 500 is generated by edging the lens along dashed line G, the second spring connector 20 can be inserted into the opening that is formed in an edge portion K of the edge lens 500 by the first and fourth recessed portions 501 and 505 located opposite each other. As shown in the enlarged cross-sectional view of the edge portion K, because of the difference (w9) in length between the first and fourth recessed portions 501 and 505, the forward end 21 of the second spring connector 20 inserted into the opening contacts the end portion of the first recessed portion 501 formed in the first transparent substrate 410 and is thus electrically connected to the blanket transparent electrode 503.

Likewise, as shown in FIG. 27(*c*), when the edged lens 500 is generated by edging the lens along dashed line G, the first spring connector 10 can be inserted into the opening that is formed in an edge portion L of the edge lens 500 by the second and third recessed portions 502 and 504 located opposite each other. As shown in the enlarged cross-sectional view of the edge portion L, because of the difference (w9) in length between the second and third recessed portions 502 and 504, the forward end 11 of the first spring connector 10 inserted into the opening contacts the end portion of the third recessed portion 504 formed in the second transparent substrate 420 and is thus electrically connected to the blanket transparent electrode 506.

In the edged lens 500, by adjusting the depth of the first and fourth recessed portions 501 and 505 and the depth of the second and third recessed portions 502 and 504, the position where the second spring connector 20 is inserted can be placed directly above the position where the first spring connector 10 is inserted; this offers the advantage that the positions of the first and second spring connectors 10 and 20 formed in the eyeglass frame 2 need not be displaced relative to each other in the vertical direction as shown in FIG. 1(*b*). Furthermore, since the connecting lines can each be formed as a blanket transparent electrode by depositing ITO, the production process can be simplified by eliminating the step of patterning ITO, and thus the lens can be fabricated easily and at relatively low cost.

The recessed portions are not limited to rectangular in shape, but each may be formed, for example, in a circular or elliptical shape or in a triangular or other polygonal shape; further, the first to fourth recessed portions 501 to 505 may each be formed in a different shape or may all be formed in the same shape.

FIG. 28 is a diagram showing a finished lens 510'.

FIG. 28(*a*) is a plan view showing the first transparent substrate 410 forming the finished lens 510', FIG. 28(*b*) is a plan view showing the second transparent substrate 420 forming the finished lens 510', FIG. 28(*c*) is a plan view showing the finished lens 510', and FIG. 28(*d*) is an enlarged cross-sectional view showing an edge portion of an edged lens 510 generated by edging the lens along dashed line G.

As shown in FIG. 28(*a*), in the first transparent substrate 410, a blanket transparent electrode 512 is formed by depositing ITO everywhere except the portion where the first transparent electrode 411 is formed, and a first recessed portion 511 is provided as illustrated. In the second transparent substrate 420 also, as shown in FIG. 28(*b*), a blanket transparent electrode 514 is formed by depositing ITO everywhere except the portion where the second transparent electrode 421 is formed, and a second recessed portion 513 is provided as illustrated. Further, as shown in FIG. 28(*c*), when the first and second transparent substrates 410 and 420 are bonded together by interposing the sealing agent, etc., therebetween, the first recessed portion 511 is located opposite the second recessed portion 513.

As shown in FIG. 28(*c*), when the edged lens 510 is generated by edging the lens along dashed line G, the first and second spring connector 10 and 20 can be inserted into the opening that is formed in an edge portion P of the edge lens 510 by the first and second recessed portions 511 and 513 located opposite each other. As shown in the enlarged cross-sectional view of the edge portion P, the forward end 11 of the first spring connector 10 inserted into the opening contacts a step formed on the first recessed portion 511 and is thus electrically connected to the blanket transparent electrode 512. Likewise, the forward end 21 of the second spring connector 20 inserted into the opening contacts a step formed on the second recessed portion 513 and is thus electrically connected to the blanket transparent electrode 514.

In the edged lens 510, since the first spring connector 10 and the second spring connector 20 can be inserted into the same opening formed in the edge face of the lens, the advantage is that the area where the recessed portions are formed can be reduced.

The recessed portions are not limited to rectangular in shape, but each may be formed, for example, in a circular or elliptical shape or in a triangular or other polygonal shape; further, the first and second recessed portions 511 and 513 may be formed in different shapes or may both be formed in the same shape.

Figure 29:
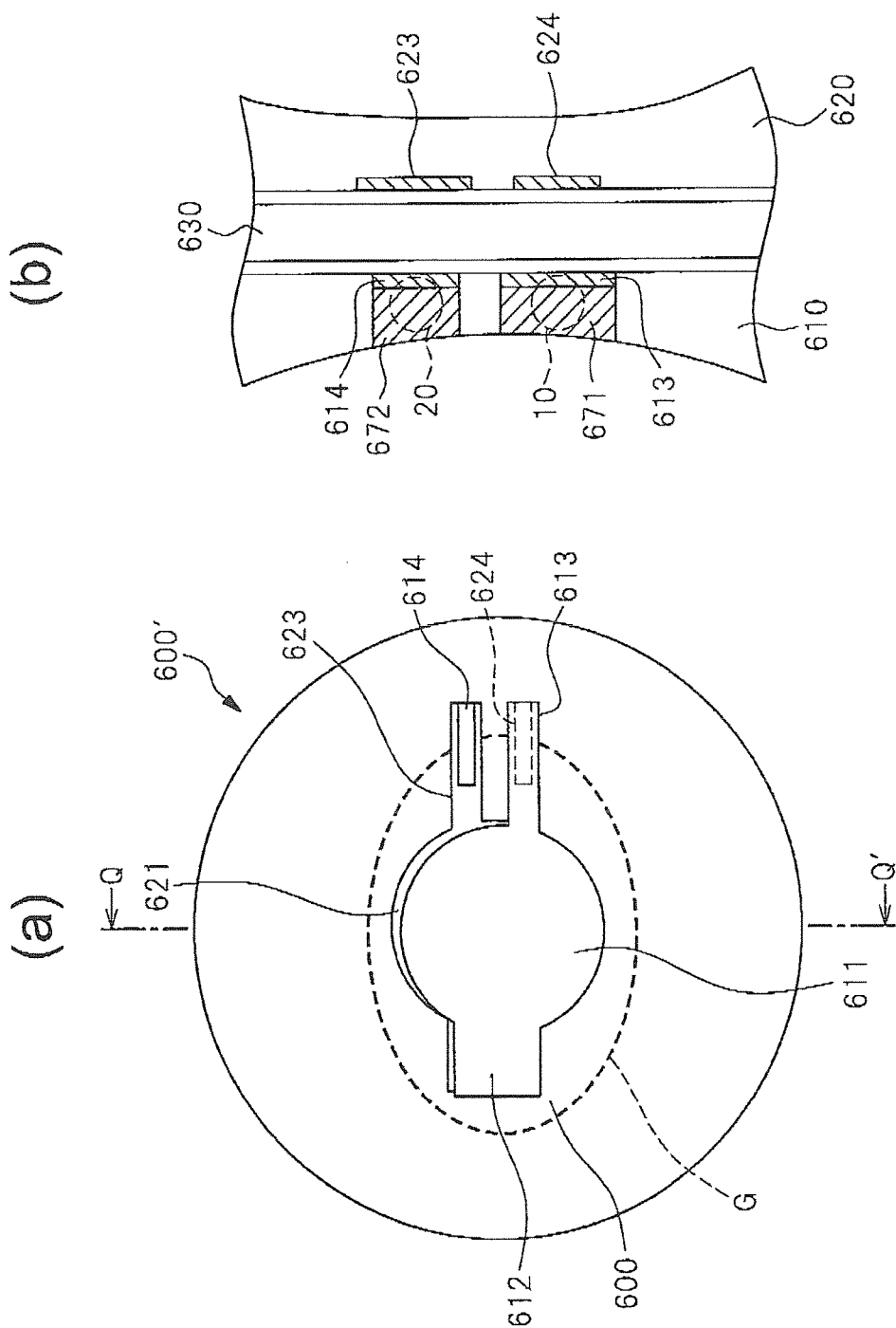
FIG. 29 is a diagram for explaining an edged lens 600.
Figure 30:
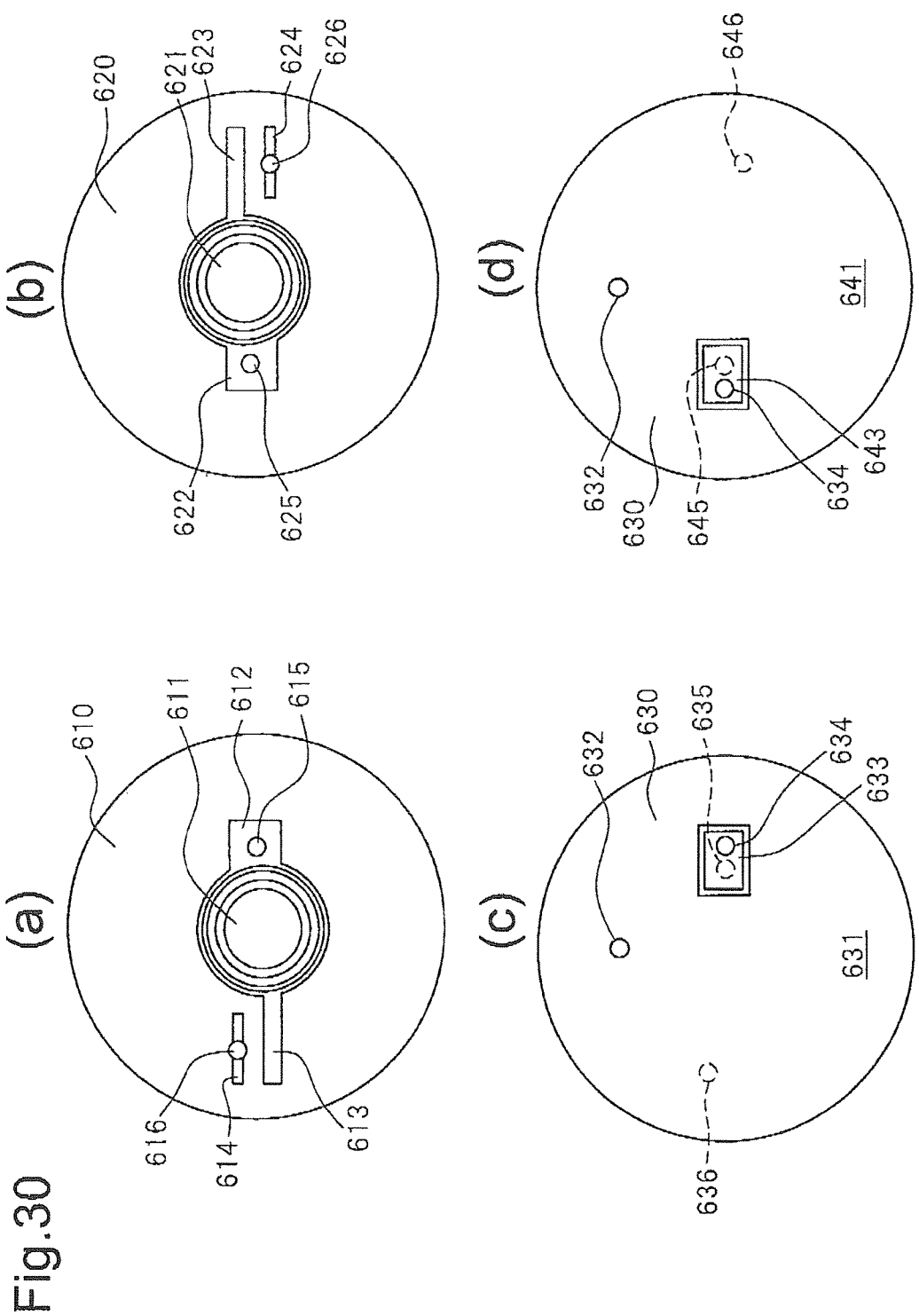
FIG. 30 is a diagram showing two transparent substrates and an transparent intermediate substrate which together constitute a finished lens 600'.

FIGS. 29 and 30 are diagrams for explaining an edged lens 600 as an alternative liquid crystal lens.

The liquid crystal lens described thus far has been constructed by bonding two transparent together by interposing a sealing agent, etc., therebetween, but the edged lens 600 shown here is constructed by interposing a transparent intermediate substrate 630 between a first transparent substrate 610 and a second transparent substrate 620. The edged lens 600 further includes a first liquid crystal lens structure 660 comprising a first liquid crystal layer 651 sandwiched between the first transparent substrate 610 and the transparent intermediate substrate 630, and a second liquid crystal lens structure 670 comprising a second liquid crystal layer 661 sandwiched between the second transparent substrate 620 and the transparent intermediate substrate 630. Furthermore, since the first and second liquid crystal lens structures 660 and 670 are oriented so that their polarization planes cross at right angles to each other, polarization dependence can be eliminated in the edged lens 600.

FIG. 29(a) is a plan view of a pre-edging lens 600' before its outer shape is edged along dashed line G to fit the eyeglass frame 2 of the electronic eyeglasses 1 so that the lens can be mounted to the electronic eyeglasses 1 shown in FIG. 1, and FIG. 29(b) is an enlarged view of an edge portion of the edged lens 600 generated by edging. FIG. 30(a) is a diagram showing the first transparent substrate 610 forming the finished lens 600', FIG. 30(b) is a diagram showing the second transparent substrate 620 forming the finished lens 600', FIG. 30(c) is a diagram showing the surface on the first transparent substrate side of the transparent intermediate substrate 630 forming the finished lens 600', and FIG. 30(d) is a diagram showing the surface on the second transparent substrate side of the transparent intermediate substrate 630 forming the finished lens 600'.

As shown in FIG. 30(a), a first transparent electrode 611 formed by sputtering ITO on a Fresnel lens structure 654 to be described later and first and second connecting lines 612 and 613 connected to the first transparent electrode 611 are provided on the first transparent substrate 610. Further, a third connecting line 614 electrically isolated from the first transparent electrode 611 and hence from the first and second connecting lines 612 and 613 is provided on the first transparent substrate 610.

As shown in FIG. 30(b), a second transparent electrode 621 formed by sputtering ITO on a Fresnel lens structure 664 to be described later and fourth and fifth connecting lines 622 and 623 connected to the second transparent electrode 621 are provided on the second transparent substrate 620. Further, a sixth connecting line 624 electrically isolated from the second transparent electrode 621 and hence from the fourth and fifth connecting lines 622 and 623 is provided on the second transparent substrate 620.

As shown in FIG. 30(c), a third transparent electrode 633 (island electrode) formed from ITO and a fourth transparent electrode 631 electrically isolated from the third transparent electrode 633 and formed from ITO covering almost the entire surface are provided on the first transparent substrate 610 side of the transparent intermediate substrate 630. Similarly, as shown in FIG. 30(d), a fifth transparent electrode 643 (island electrode) formed from ITO and a sixth transparent electrode 641 electrically isolated from the fifth transparent electrode 643 and formed from ITO covering almost the entire surface are provided on the second transparent substrate 620 side of the transparent intermediate substrate 630. Further, a first plated-through hole 632 is formed in the transparent intermediate substrate 630 to electrically connect the fourth transparent electrode 631 to the sixth transparent electrode 641. A second plated-through hole 634 is formed in the transparent intermediate substrate 630 to electrically connect the third transparent electrode 633 to the fifth transparent electrode 643.

When the finished lens 600' is fabricated by bonding together the first and second transparent substrates 610 and 620 by sandwiching the transparent intermediate substrate 630 therebetween, the third connecting line 614 formed on the first transparent substrate 610 and the fourth transparent electrode 631 formed on the transparent intermediate substrate 630 are electrically connected at point 636 by a conductive paste 616, and the sixth connecting line 624 formed on the second transparent substrate 620 and the sixth transparent electrode 641 formed on the transparent intermediate substrate 630 are electrically connected at point 646 by a conductive paste 626. Further, the first connecting line 612 formed on the first transparent substrate 610 and the third transparent electrode 633 formed on the transparent intermediate substrate 630 are electrically connected at point 635 by a conductive paste 615, and the fourth connecting line 622 formed on the second transparent substrate 620 and the fifth transparent electrode 643 formed on the transparent intermediate substrate 630 are electrically connected at point 645 by a conductive paste 625.

Since the first and second transparent substrates 610 and 620 are identical in shape, the step of depositing the films on the respective substrates is also identical, and hence the production of the finished lens 600' can be accomplished easily and at relatively low cost.

As shown in FIG. 29(b), after the edging, a first connecting portion 671 is formed by ITO or a conductive paste on the edge face of the edged lens 600 in contacting relationship with the second connecting line 613, and likewise, a second connecting portion 672 is formed by ITO or a conductive paste on the edge face of the edged lens 600 in contacting relationship with the third connecting line 614.

The two spring connectors are connected to the edged lens 600 by forming the above connecting portions, but the connections may be accomplished in other ways; for example, they may be connected by forming the recessed portions or openings as earlier described.

Figure 31:
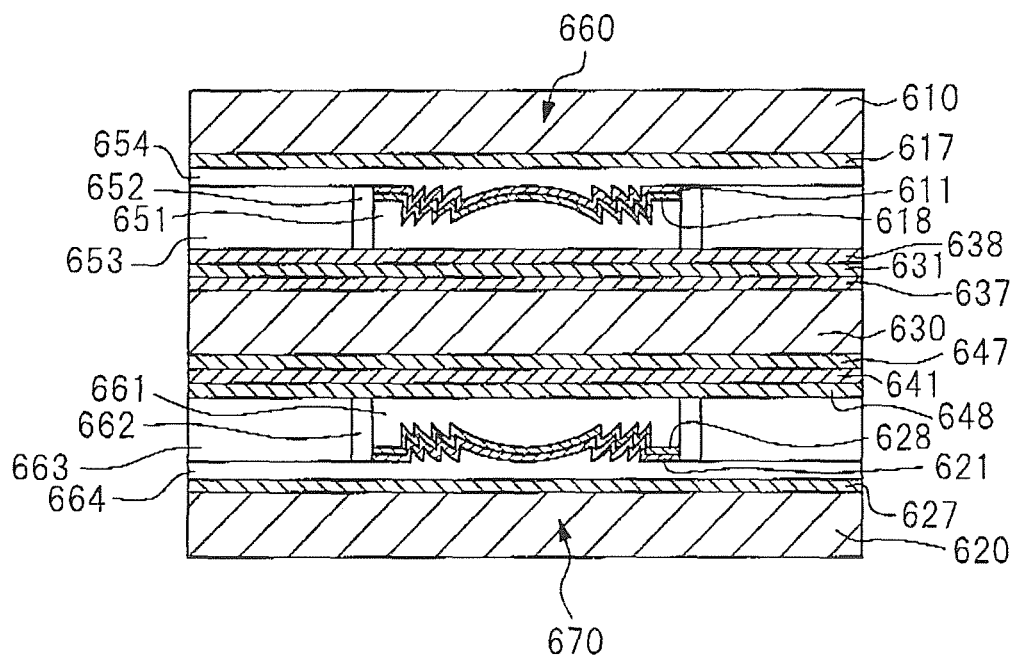
FIG. 31 is a cross-sectional view taken along line QQ' in FIG. 29(a).

FIG. 31 is a cross-sectional view taken along line QQ' in FIG. 29(a).

As shown in FIG. 31, the first liquid crystal lens structure 660 in the edged lens 600 comprises the first transparent substrate 610, the transparent intermediate substrate 630, and the liquid crystal layer 651 sandwiched between the first transparent substrate 610 and the transparent intermediate substrate 630 and sealed by a sealing agent 652. The liquid crystal layer 651 is formed using a homogeneously aligned liquid crystal, but use may be made of a vertically aligned liquid crystal.

On the first transparent substrate 610, there are formed one on top of another a first gas barrier layer 617 for preventing gases generated from the transparent substrate from infiltrating into the liquid crystal layer 651, the Fresnel lens structure 654, the first transparent electrode 611 overlying the Fresnel lens structure 654, and a first alignment film 618 overlying the first transparent electrode 611.

On the first transparent substrate 610 side of the transparent intermediate substrate 630, there are formed one on top of another a second gas barrier layer 637 for preventing gases generated from the transparent substrate from infiltrating into the liquid crystal layer 651, the fourth transparent electrode 631 as a planar transparent electrode disposed opposite the first transparent electrode 611, and a second alignment film 638 overlying the fourth transparent electrode 631.

The sealing agent 652 contains a plurality of spacers formed from a resin in order to maintain the spacing between the first and fourth transparent electrodes 611 and 631 constant. A transparent resin 653 is filled into the space around the periphery of the sealing agent 652.

As shown in FIG. 31, the second liquid crystal lens structure 670 in the edged lens 600 comprises the second transparent substrate 620, the transparent intermediate substrate 630, and the liquid crystal layer 661 sandwiched between the second transparent substrate 620 and the transparent intermediate substrate 630 and sealed by a sealing agent 662. The liquid crystal layer 661 is formed using a homogeneously aligned liquid crystal, but use may be made of a vertically aligned liquid crystal.

On the second transparent substrate 620, there are formed one on top of another a third gas barrier layer 627 for preventing gases generated from the transparent substrate from infiltrating into the liquid crystal layer 661, the Fresnel lens structure 664, the second transparent electrode 621 overlying the Fresnel lens structure 664, and a third alignment film 628 overlying the second transparent electrode 621.

On the second transparent substrate 620 side of the transparent intermediate substrate 630, there are formed one on top of another a fourth gas barrier layer 647 for preventing gases generated from the transparent substrate from infiltrating into the liquid crystal layer 661, the sixth transparent electrode 641 as a planar transparent electrode disposed opposite the second transparent electrode 621, and a fourth alignment film 648 overlying the sixth transparent electrode 641.

The sealing agent 662 contains a plurality of spacers formed from a resin in order to maintain the spacing between the second and sixth transparent electrodes 621 and 641 constant. A transparent resin 663 is filled into the space around the periphery of the sealing agent 662.

The thicknesses, materials, etc., of the above layers are the same as those of the corresponding layers in the earlier described example of the pre-edging lens 400', and therefore, will not be specifically described herein. Further, in FIG. 31, it should be noted that, for convenience of explanation, the thickness of each substrate and the relative thicknesses of the layers are not drawn to scale. The structure of the Fresnel lens surface of each of the first and second liquid crystal lens structures is also the same as that earlier described in the example of the pre-edging lens 400', and therefore, will not be specifically described herein.

Figure 32:
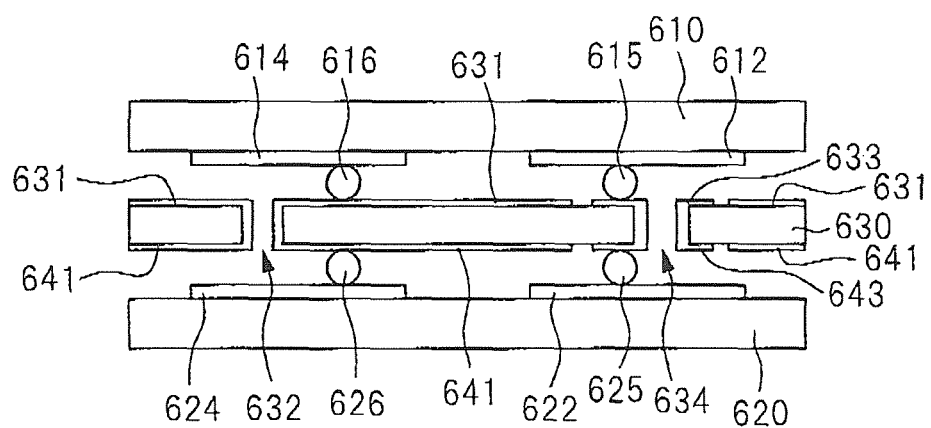
FIG. 32 is a diagram for explaining how the first and second spring connectors 10 and 20 are electrically connected to various layers in an edged lens 600.

FIG. 32 is a diagram for explaining how the first and second spring connectors 10 and 20 are electrically connected to the respective layers in the edged lens 600.

As shown in FIG. 29(*b*), the first spring connector 10 attached to the eyeglass frame 2 is brought into contact with the connecting portion 671 through the edge face of the edged lens 600. As a result, the first spring connector 10 is electrically connected to the second connecting line 613, and hence to the first transparent electrode 611 and first connecting line 612 electrically connected to the second connecting line 613, the third transparent electrode 633 electrically connected to the first connecting line 612 via the conductive paste 615, the fifth transparent electrode 643 electrically connected to the third transparent electrode 633 via the plated-through hole 634, the fourth connecting line 622 electrically connected to the fifth transparent electrode via the conductive paste 625, and the second transparent electrode 621 electrically connected to the fourth connecting line 622, and these electrodes and lines can thus be held at a prescribed potential.

Further, as shown in FIG. 29(*b*), the second spring connector 20 attached to the eyeglass frame 2 is brought into contact with the connecting portion 672 through the edge face of the edged lens 600. As a result, the second spring connector 20 is electrically connected to the third connecting line 614, and hence to the fourth transparent electrode 631 electrically connected to the third connecting line 614 via the conductive paste 616, the sixth transparent electrode 641 electrically connected to the fourth transparent electrode 631 via the plated-through hole 632, and the sixth connecting line 624 electrically connected to the sixth transparent electrode 641 via the conductive paste 626, and these electrodes and lines can thus be held at a prescribed potential.

With the electrical connections shown in FIG. 32, the voltage developed between the first and second spring connectors 10 and 20 can be applied simultaneously between the first transparent electrode 611 and the fourth transparent electrode 631 acting as a blanket counter electrode and between the second transparent electrode 621 and the sixth transparent electrode 641 acting as a blanket counter electrode. That is, when the first and second spring connectors 10 and 20 are electrically connected to the respective connecting portions 671 and 672 of the edged lens 600, prescribed voltage is applied simultaneously to the first and second liquid crystal lens structures 660 and 670.

The geometries of the third and sixth transparent electrodes 631 and 641 and the structure, etc. for applying voltage between the two opposing transparent electrodes of the two liquid crystal lens structures are not limited to those described above, but other structures, etc., may be employed. It should also be noted that, in FIG. 32, the structure of the edged lens 600 is shown in simplified form in order to facilitate the explanation of the electrical connections. In the above example, the same voltage is applied simultaneously to the first and second liquid crystal lens structures 660 and 670; alternatively, provisions may be made so that different voltages are applied separately to the respective lens structures by using four spring connectors.

Further, instead of the spring connectors for achieving electrical connections with the various kinds of electronic eyeglass lenses described above, use may be made of leaf springs, screws, pins, conductive pastes, soldering, FPCs, etc. The various kinds of electronic eyeglass lenses described above have each been constructed to achieve electrical connections with the two spring connectors, but if the eyeglass frame 2 is electrically conductive, the eyeglass frame 2 itself may be used as one of the spring connectors.

In the various kinds of electronic eyeglass lenses described above, the transparent liquid crystal lens structure 650, etc., for changing focus have been used as an optical structure. However, any other kind of optical structure can also be used, the only requirement being that the liquid crystal lens be provided with electrodes on the first or second substrate. For example, the electronic eyeglass lens may also be provided, for example, with an optical structure (or optically variable structure) whose optical characteristics or functions vary when the applied voltage is varied, such as a defogging function for defogging the lens by heating transparent heating wires, a coloring or light adjusting function (used in sunglasses) that colors the lens when voltage is applied, a shutter function for viewing 3D movies or TV programs, and a liquid crystal display function for using the lens as a headset display.

While the above description has been given by taking as examples the lenses for electronic eyeglasses, the finished lens and the edged lens can be used as optical lenses for various other applications such as electron microscopes, digital cameras, and pickup lenses, as long as the liquid crystal lens is of a structure such that, after injecting a liquid crystal material, the liquid crystal material is sealed into a portion (center portion) of the lens and its outer shape is cut to the final desired shape. Further, the liquid crystal lens can be constructed by using a Fresnel lens as its optical structure, but since the feature of the present invention does not lie in the optical structure itself, the present invention is not limited to this particular structure but can be applied to any other liquid crystal optical device that has an optical structure such as a cylindrical lens, a prism, a microlens array, or the like. Further, neither of the substrates need necessarily be provided with an optical structure such as a Fresnel lens structure. The present invention can also be applied, for example, to an optical device that has a function for controlling light by applying voltage across the electrodes formed between the substrates.

What is claimed is:

1. A method for producing a liquid crystal lens having a first transparent substrate and a second transparent substrate, the method comprising the steps of:
    placing an uncured first photosetting resin on at least one of said first and second transparent substrates so as to surround an inside space thereon;
    dropping a liquid crystal material into said inside space enclosed by said uncured first photosetting resin;
    bonding in a vacuum atmosphere, said first transparent substrate and said second transparent substrate by contacting said uncured first photosetting resin with the other of said first and second substrates so that said liquid crystal material is not leaked outside of said inside space;
    curing said uncured first photosetting resin so as to bond a cured first photosetting resin to said first transparent substrate, and said cured first photosetting resin to the second transparent substrate, so that said liquid crystal material is sealed into said inside space:
    after the step of curing said uncured first photosetting resin, filling an uncured second photosetting resin into a space created outside said cured first photosetting resin; and
    curing said second photosetting resin.

2. The liquid crystal lens production method according to claim 1, further comprising the step of forming an optical structure on at least one of said first and second transparent substrates.

3. The liquid crystal lens production method according to claim 1, further comprising the step of grinding and polishing at least one of said first and second transparent substrates to provide lens power to said substrate.

4. The liquid crystal lens production method according to claim 1, further comprising the step of cutting said first and second transparent substrates to adopt a desired outer shape.

5. The liquid crystal lens production method according to claim 2, further comprising the step of placing said optical structure with a center thereof aligned with a center of said first and second transparent substrates and performing lens forming by displacing the center of said optical structure from the center of said liquid crystal lens to be finally obtained.

6. The liquid crystal lens production method according to claim 2, further comprising the step of placing said optical structure with a center thereof displaced from a center of said first and second transparent substrates and performing lens forming so that the center of said liquid crystal lens to be finally obtained coincides with the center of said first and second transparent substrates.

7. The liquid crystal lens production method according to claim 1, wherein said first and second transparent substrates are each provided with an electrode for applying voltage to a layer made of said liquid crystal material, a respective connecting line each connected to a respective one of said electrodes, and recessed portions or openings formed in said first transparent substrate and said second transparent substrate so that at least a portion of each connecting line is located inside a respective recessed portion or opening.

8. The liquid crystal lens production method according to claim 7, further comprising
    the step of cutting said first and second transparent substrates to adopt a desired outer shape; and,
    after the step of cutting said first and second transparent substrates, the step of inserting connecting terminals for applying a respective voltage to each electrode into said respective recessed portions or openings through an edge face of said first and second transparent substrates, and electrically connecting said connecting terminals to the respective connecting lines.

9. The liquid crystal lens production method according to claim 7, wherein in the step of filling said second photosetting resin into the space created outside said first photosetting resin, said second photosetting resin is also filled into said recessed portion or opening.

10. The liquid crystal lens production method according to claim 8, further comprising the step of filling a conductive material into both said recessed portions or openings, said conductive material being electrically connected to said connecting lines and in contact with said connecting terminals.

11. The liquid crystal lens production method according to claim 10, further comprising the step of placing a respective connecting portion which is electrically connected to said conductive material and which contacts a respective connecting terminal of said connecting terminals.

12. The liquid crystal lens production method according to claim 7, wherein each recessed portion or opening has a prescribed width so as to be located in a lens edge face after said lens is formed, in order for said lens to be mounted in any kind of eyeglass frames.

13. A method for producing electronic eyeglasses, comprising the step of mounting said liquid crystal lens produced with the production method of claim 8, in an eyeglass frame for eyeglasses having said connecting terminals in such a manner that said respective connecting terminals can be electrically connected to said electrodes provided in said liquid crystal lens.

* * * * *